United States Patent [19]

Farfan

[11] Patent Number: 5,828,735
[45] Date of Patent: Oct. 27, 1998

[54] GAMES ON HOLD TELEPHONY SERVICE

[75] Inventor: Daniel Joseph Farfan, Phoenix, Ariz.

[73] Assignee: AG Communication Systems Corporation, Phoenix, Ariz.

[21] Appl. No.: 686,778

[22] Filed: Jul. 25, 1996

[51] Int. Cl.$^6$ .................................................. H04M 11/00
[52] U.S. Cl. .................... 379/93.13; 379/90.01; 379/212; 379/201
[58] Field of Search .............................. 379/93.13, 93.14, 379/90.01, 201, 207, 210, 211, 212, 215, 218, 265, 266, 158, 157, 162, 165, 101.01

[56] References Cited

U.S. PATENT DOCUMENTS

| | | | |
|---|---|---|---|
| 4,577,067 | 3/1986 | Levy et al. | 379/101.01 |
| 5,164,982 | 11/1992 | Davis | 379/93.18 |
| 5,557,658 | 9/1996 | Gregorek et al. | 379/215 |
| 5,608,785 | 3/1997 | Kasday | 379/93.13 |

*Primary Examiner*—Stella Woo
*Attorney, Agent, or Firm*—Gregory G. Hendricks

[57] ABSTRACT

An on hold telephony service that allows a subscriber to the service to place a call on hold and make interactive games available to the party placed on hold. The on hold service can be implemented on a central office switch or an enhanced services platform connected to the switch. The on hold service is accessed by the subscriber to the service through a transfer function that causes the call to be maintained by the on hold service. The party so placed on hold by the subscriber can then interactively play the various games made available by the service. The subscriber to the service can then send a message to the other party or cause him to be reconnected to the subscriber either immediately or when the other party is finished playing games and is ready to be reconnected to the subscriber.

21 Claims, 33 Drawing Sheets

GAMES ON HOLD TELEPHONY SERVICE

CROSS REFERENCE TO RELATED APPLICATIONS

Cross reference is made to the related U.S. Patent Applications entitled: "Telephone Call on Hold Service For A Party Placed On Hold By Another Party" (Ser. No. 08/686,780); and "Information On Hold Telephony Service" Ser. No. 08/686,779 filed on the same date, and by the same assignee as this Application.

FIELD OF THE INVENTION

The present invention relates to telephony service and more particularly to a games-on-hold service which allows a subscriber to the service to temporarily dispose of a telephone call by transferring the other party to the games-on-hold service. That other party can then play games-on-hold until he or the subscriber requests that the parties be reconnected.

BACKGROUND OF THE INVENTION

Call on hold service is old and well known. Typically, when a party wishes to place another party on hold, the party placing the call on hold presses the hold button on his telephone. That telephone, or the associated PABX or central office switch, then maintains the connection to the other party while allowing the party who placed the call on hold to hang up. Such call on hold services also typically provide music or an announcement on hold feature, which causes music or voice to be played over the line to the party placed on hold. Such call on hold services are useful to the party who places the call on hold, but they are often a cause of discontent to the party who has been placed on hold, even if he is provided with music to listen to, while on hold.

Accordingly, it is an object of the present invention to provide an on-hold service that provides the person placed on hold with the ability to engage in a game activity while on hold, rather than suffer the discontent associated with being placed on hold and having nothing to do but wait for the other party to return to the call.

SUMMARY OF THE INVENTION

The games-on-hold system of the present invention typically includes a computer such as an enhanced services platform (ESP) connected to a central office or other switching system. The games-on-hold software is resident on the ESP and can be accessed by a subscriber to the games-on-hold system when he decides to put the other party to a telephone call on hold.

The subscriber accesses the games-on-hold system through a transfer or direct access function. When so accessed the games-on-hold system instructs the subscriber to hang up his telephone in order to activate the games-on-hold service. When the subscriber hangs up the switching system connects the other party to the ESP and disconnects the subscriber from the ESP. The games-on-hold system then sends prompt messages to the other party indicating the various game options available to that party. That party then requests selected game playing options by sending game option selection response messages to the games-on-hold system which thereby engages in a game with that party.

DESCRIPTION OF THE PREFERRED EMBODIMENT

Figure 1:
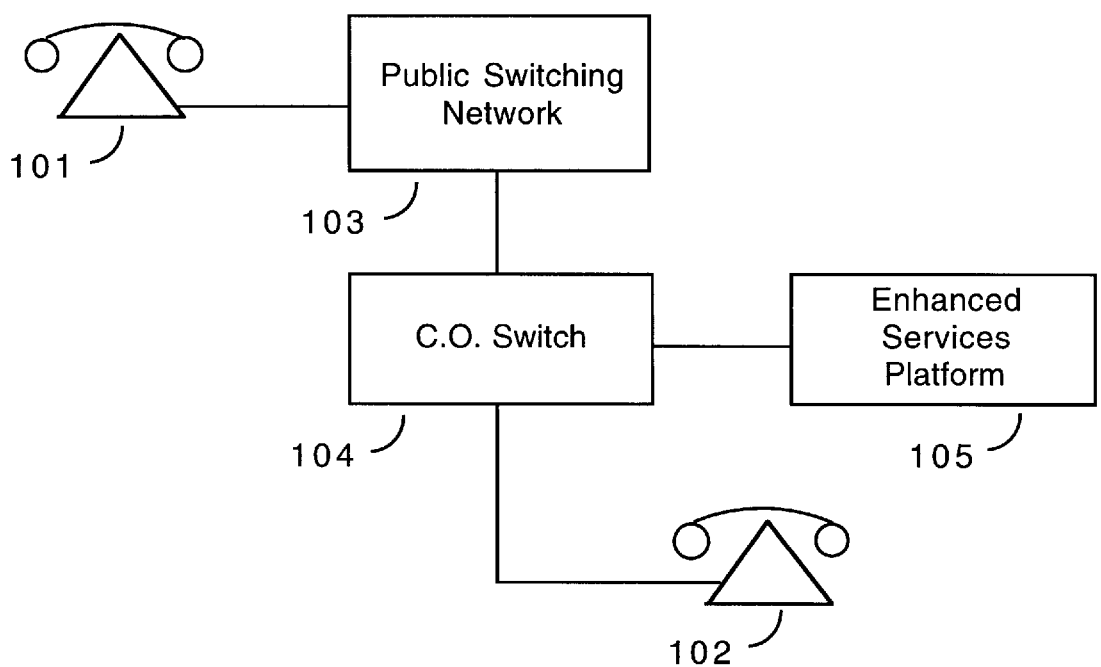
FIG. 1 of the accompanying drawing is a block diagram of a telephone system utilizing the games-on-hold service of the present invention.

The on-hold service of the present invention can be implemented on a central office switch, a PABX or an enhanced services platform or other computer, e.g., personal computer or work station, connected to such a switch or PABX. FIG. 1 shows the arrangement of the telephone system in which two parties could be connected together via a central office switch, and the on-hold service would be implemented on an enhanced services platform. The on-hold service of the present invention allows a party to place another party on-hold by connecting him to the on-hold service. That service provides the party placed on-hold with the capability of playing the various types of the games made available by that service, which could be audio, video or both. One such game is disclosed in the present invention. Accordingly, that service is referred to as games-on-hold service.

As shown in FIG. 1, telephone 101 is used by Party A to connect to telephone 102 which is used by Party B. The connection between telephone 101 and telephone 102 is via public switching network 103 and central office switch 104. If, however, both Party A and Party B were connected to central office switch 104, then there would be no need for the call to be placed through the public switching network 103, but rather Party A would be connected to Party B via central office switch 104 only. Once Party B decides that he wants to place Party A on-hold he can access the games-on-hold service by utilizing the transfer function or the hook switch flash. Central office switch 104 would respond to the hook switch flash generated by the hook switch or transfer button, by transferring the call to enhanced services platform (ESP) 105 which is connected to central office switch 104. In this preferred embodiment the games-on-hold software is implemented on ESP 105. Party B could then hang up the telephone and the call would be maintained by central office switch 104 and ESP 105.

A menu providing game instructions and features would then be played by games-on-hold software and Party A would play the games accordingly. Either Party A or Party B can terminate the playing of the games. If party A, i.e., the game player, wants to terminate the game the call is also terminated the same as if a party placed on hold had hung up. However, if Party B wants to cause the game to be terminated he can access the games-on-hold service and cause the player to be reconnected to Party B at that time, or Party B can leave a message with the service, to be sent to the player, advising him that Party B is now available for reconnection once the player terminates the game playing.

If the player terminates the game playing, the ESP disconnects from the player and the player's instance of games-on-hold software is released and made available for use by another call. If the party who placed the call on hold, i.e., Party B, wants to be reconnected he would again access games-on-hold service and request that he be reconnected either immediately or when the player is ready. Party B would then hang up or wait for reconnection to the player and the games-on-hold software would send a message to the player advising him that he will be reconnected to Party B either immediately or when the player requests reconnection. The games-on-hold software would then either connect Party B to the player or call him when the player requests reconnection. In either case the connection would be reestablished through the switching network in the ESP.

Figure 2:
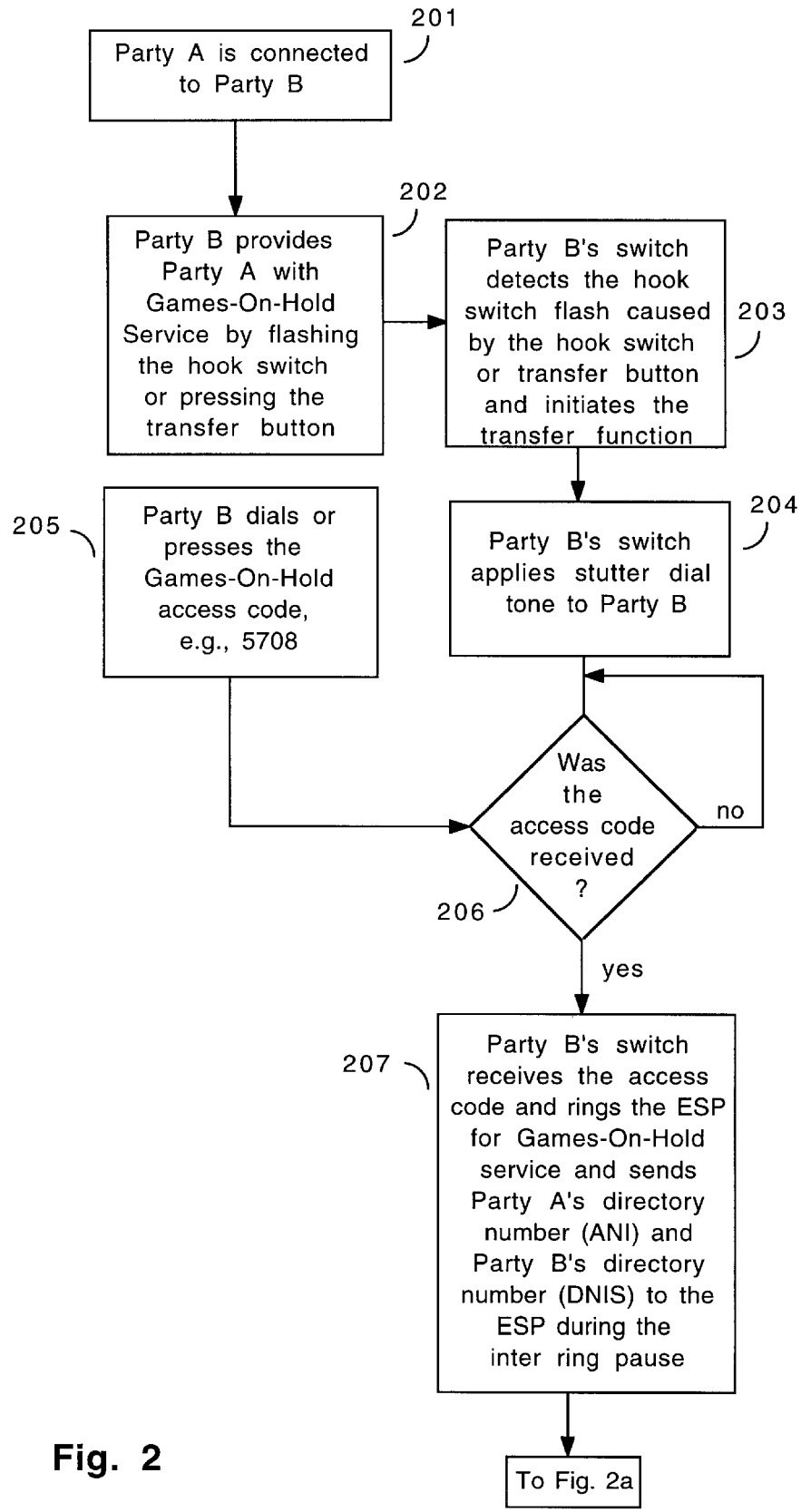
FIGS. 2–17 of the accompanying drawing are flow charts of the games-on-hold service of the present invention.

The actual operation of the games-on-hold service is shown in FIGS. 2–20. Referring now to FIG. 2, Party A is initially connected to Party B (block 201). The connection is via public switching telephone network 103 and central office (CO) switch 104, unless Party A is connected directly to the same switch as Party B. In the latter case Party A would be connected to Party B via CO switch 104 only. When Party B decides to place Party A on hold he indicates the process of providing Party A with access to games-on-hold service by flashing his hook switch or pressing the transfer button (block 202). Games-on-hold service would be installed on either CO switch 104 or ESP 105. In the implementation shown in FIG. 1 such software would typically be installed on ESP 105. Operation of the transfer button results in an on-hook signal similar to that caused by flashing the hook switch.

Central office switch 104 then detects Party B's hook switch flash, caused by either the hook switch or the transfer button, and initiates the transfer function (block 203). Party B's switch then applies stutter dial tone to Party B's telephone (block 204) and Party B then dials or presses the games-on-hold access code, e.g., 5708 (block 205). Party B's switch then waits for reception of the games-on-hold access code (block 206). Once Party B's switch receives the access code it rings the ESP for games-on-hold service and sends Party A's directory number and Party B's directory number to the ESP during the inter ring pause (block 207). Party A's directory number is provided via the automatic number identity (ANI) feature in the central office switch and Party B's directory number is provided under the Directory Number Information Service (DNIS) feature of the central office switch.

Figure 2A:
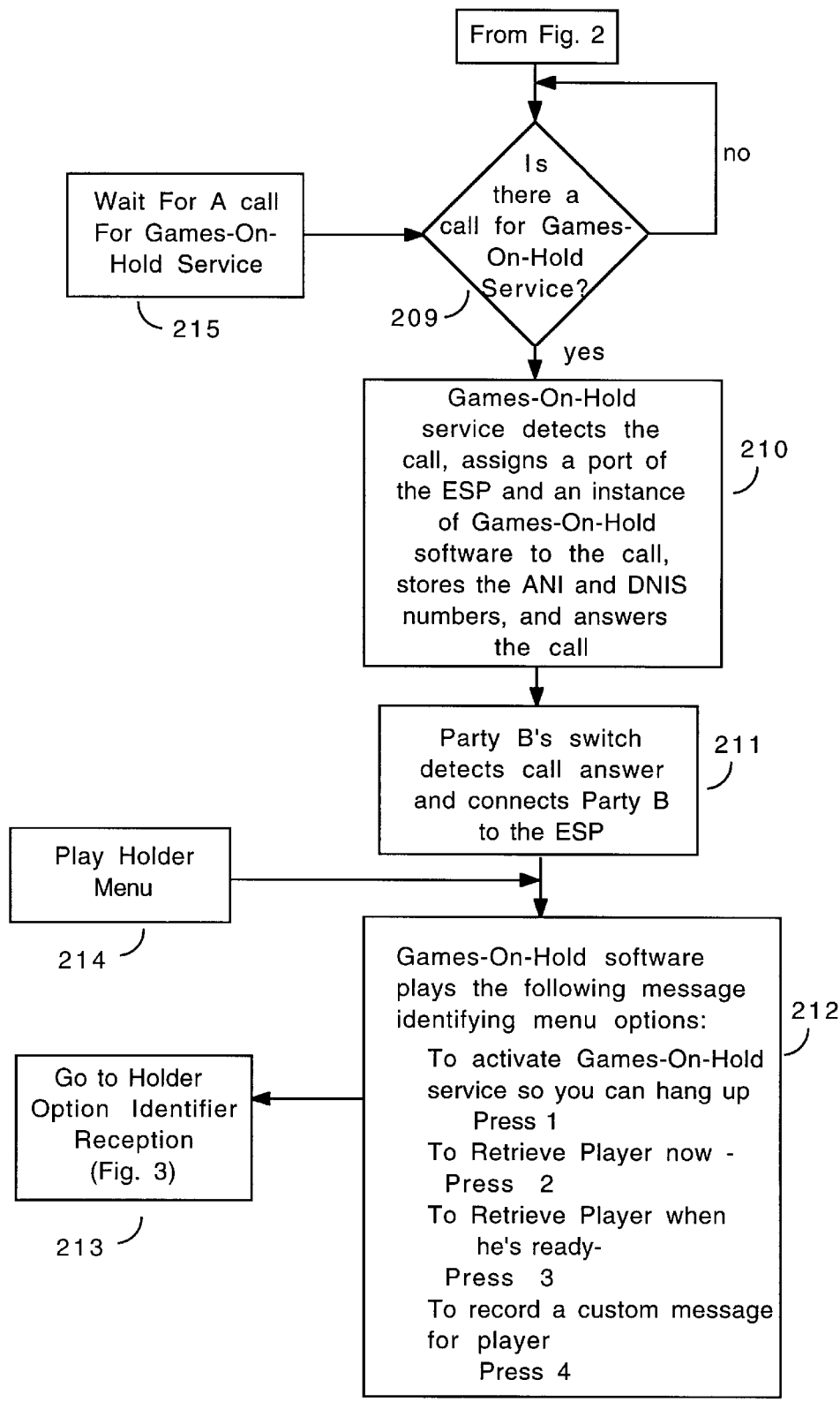

Referring now to FIG. 2a, once the ESP detects the call (block 209) it assigns a port of the ESP and instance of games-on-hold software to the call, and the games-on-hold software then stores the ANI and DNIS numbers and answers the call (block 210). Party B's switch then detects call answer and connects Party B to the ESP (block 211).

Games-on-hold software then plays a message identifying the menu options available to Party B. Those options include pressing 1 to activate the games-on-hold service, so Party B can hang up, pressing 2 to immediately retrieve a player who had previously been connected to games-on-hold service, pressing 3 to retrieve such a player when he is ready, and pressing 4 to record a custom message for the player (block 212). The games-on-hold software then goes to the Holder Option Identifier Reception mode of operation (block 213). The playing of the holder menu (block 212) can also be entered from other modes of operation of games-on-hold the software at the Play Holder Menu entry point (block 214). Also other modes of operation of games-on-hold software can transfer to block 215 to wait for a call for games-on-hold service.

Figure 3:
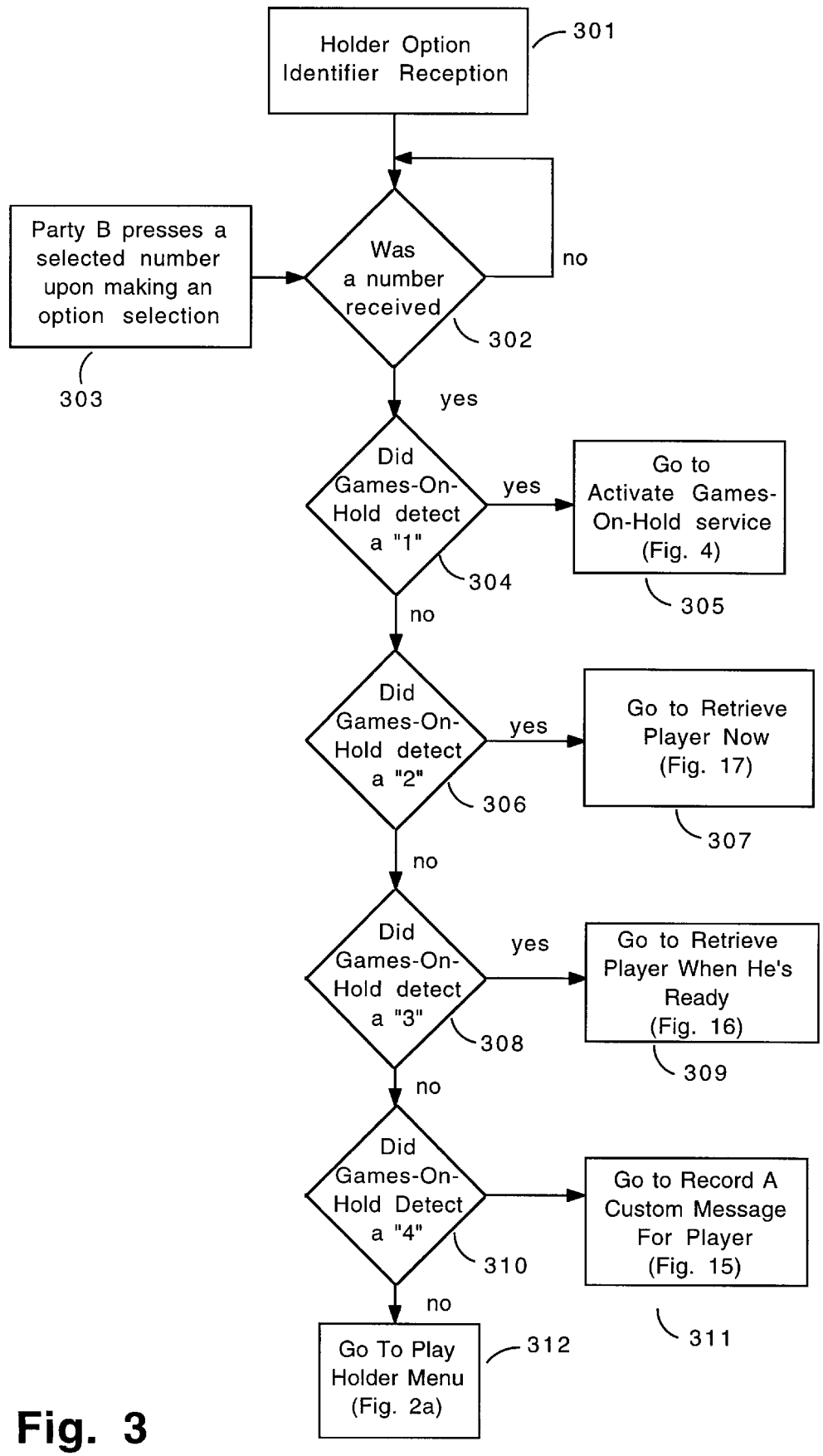

Referring now to FIG. 3, the games-on-hold software enters the Holder Option Identifier Reception mode of operation at block 301. In this mode of operation the games-on-hold software waits for a number to be received (block 302). While waiting for such a number, Party B makes an option selection and presses the corresponding number (block 303). Once such a number is received (block 302), the games-on-hold software analyzes it to determine whether it was a 1, 2, 3 or 4. If a number 1 had been detected (block 304), games-on-hold software goes to Activate Games-on-hold Service (block 305). If a number 2 had been detected (block 306), games-on-hold software goes to Retrieve Player Now (block 307). If a number 3 had been detected (block 308), games-on-hold software goes to Retrieve Player When He's Ready (block 309). And, if a number 4 had been detected (block 310), games-on-hold software goes to Record A Custom Message For Player (block 311). If an invalid number had been received games-on-hold software then returns to the Play Holder Menu mode of operation (block 312).

Figure 4:
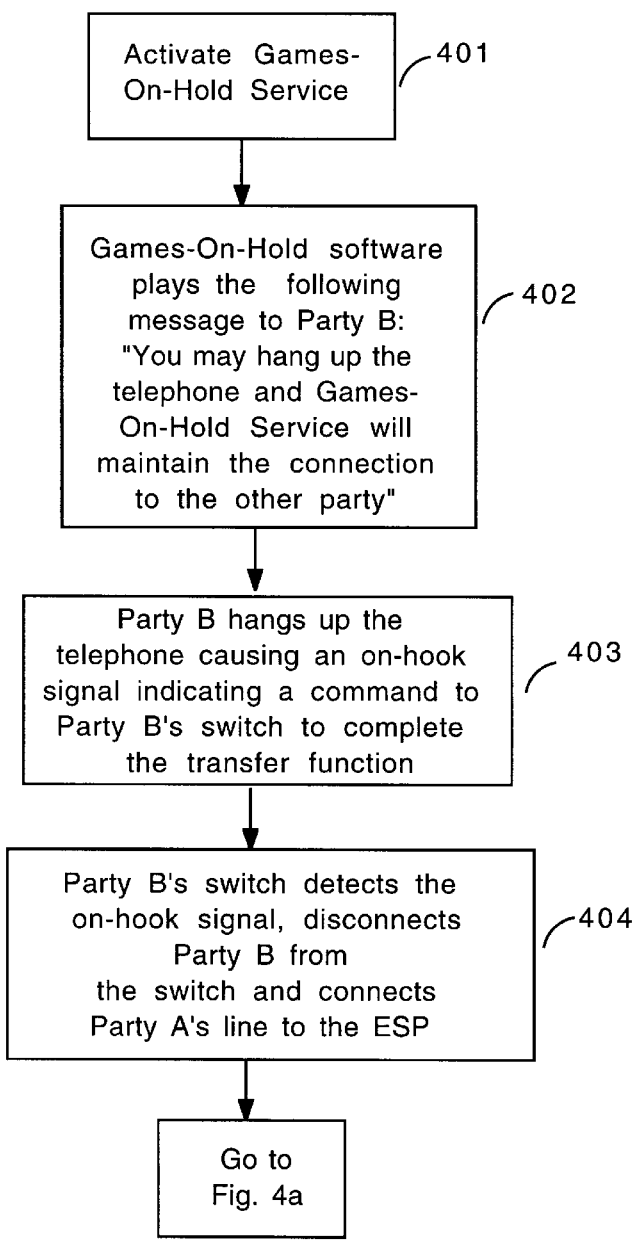

Referring now to FIG. 4 the games-on-hold software enters the Activate Games-on-hold Service mode of operation at block 401. This mode of operation results from Party B having decided to connect Party A to games-on-hold service. Consequently, games-on-hold software plays a message to Party B informing him that he may hang up his telephone and games-on-hold service will maintain the connection to the other party, i.e., Party A (block 402). Party B then hangs up the telephone causing an on-hook signal which indicates a command to Party B's switch to complete the transfer function (block 403). Party B's switch then detects the on-hook signal, disconnects Party B from the switch, and completes the connection of Party A's line to the ESP (block 404).

Figure 4A:
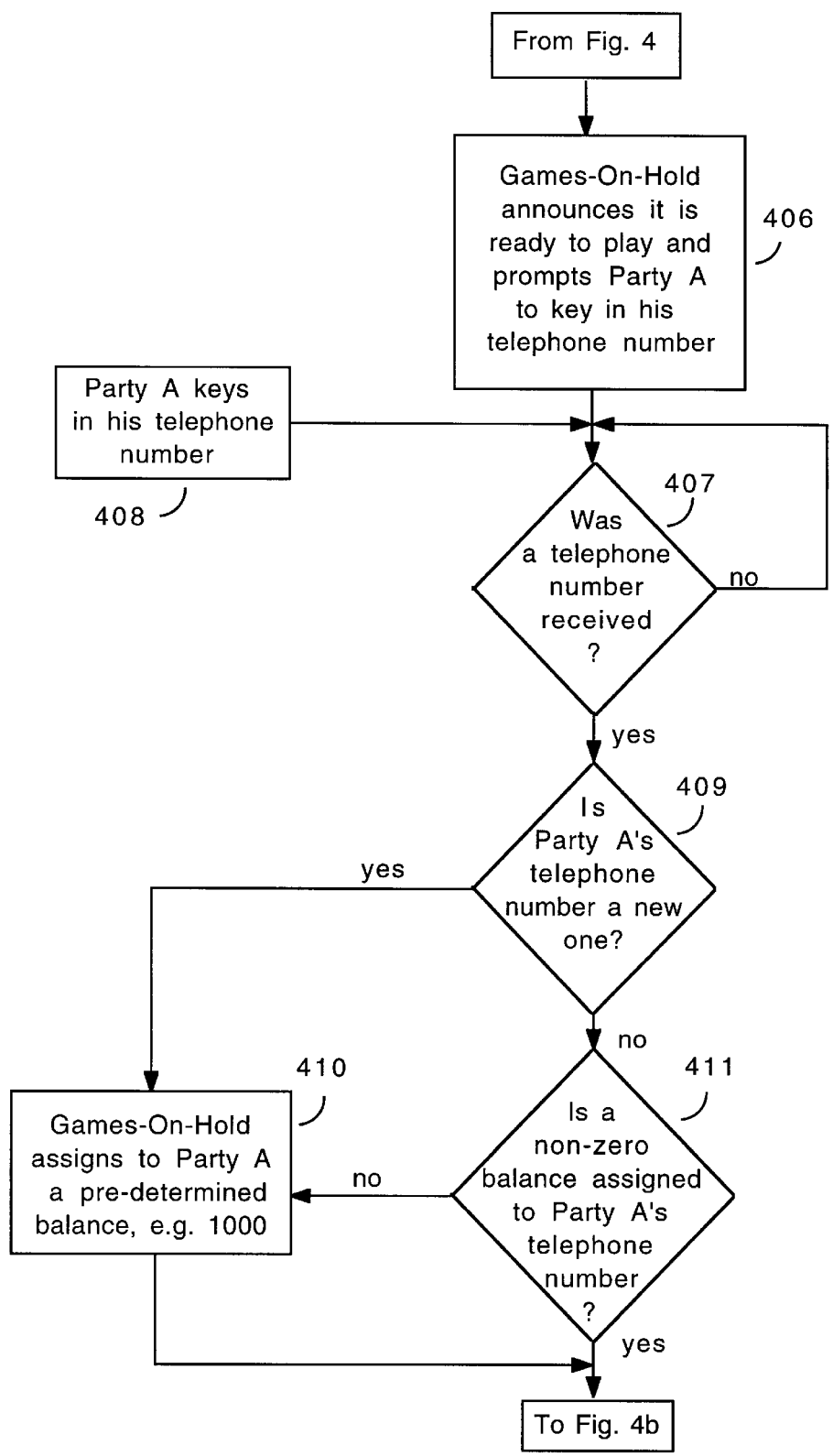

Referring now to FIG. 4a, games-on-hold software, after waiting a predetermined time, such as 2 seconds, announces to Party A that it is ready to play and prompts Party A to key in his telephone number (block 406). Games-on-hold software then waits for reception of Party A's telephone number (block 407). Party A then keys in his telephone number (block 408) and games-on-hold software detects that it has been received in block 407. Games-on-hold software then compares the received telephone number from Party A with its table of telephone numbers for players of games-on-hold (block 409). If Party A's telephone number is a new one, and not the telephone number of a previous games-on-hold player, then games-on-hold software assigns to Party A a predetermined balance, e.g., 1000 (block 410). If Party A's telephone number was not a new one, games-on-hold software retrieves his balance and determines whether that balance was non-zero (block 411). If the balance was not nonzero, i.e., it was in fact zero, then games-on-hold software again assigns the predetermined balance to Party A (block 410).

Figure 4B:
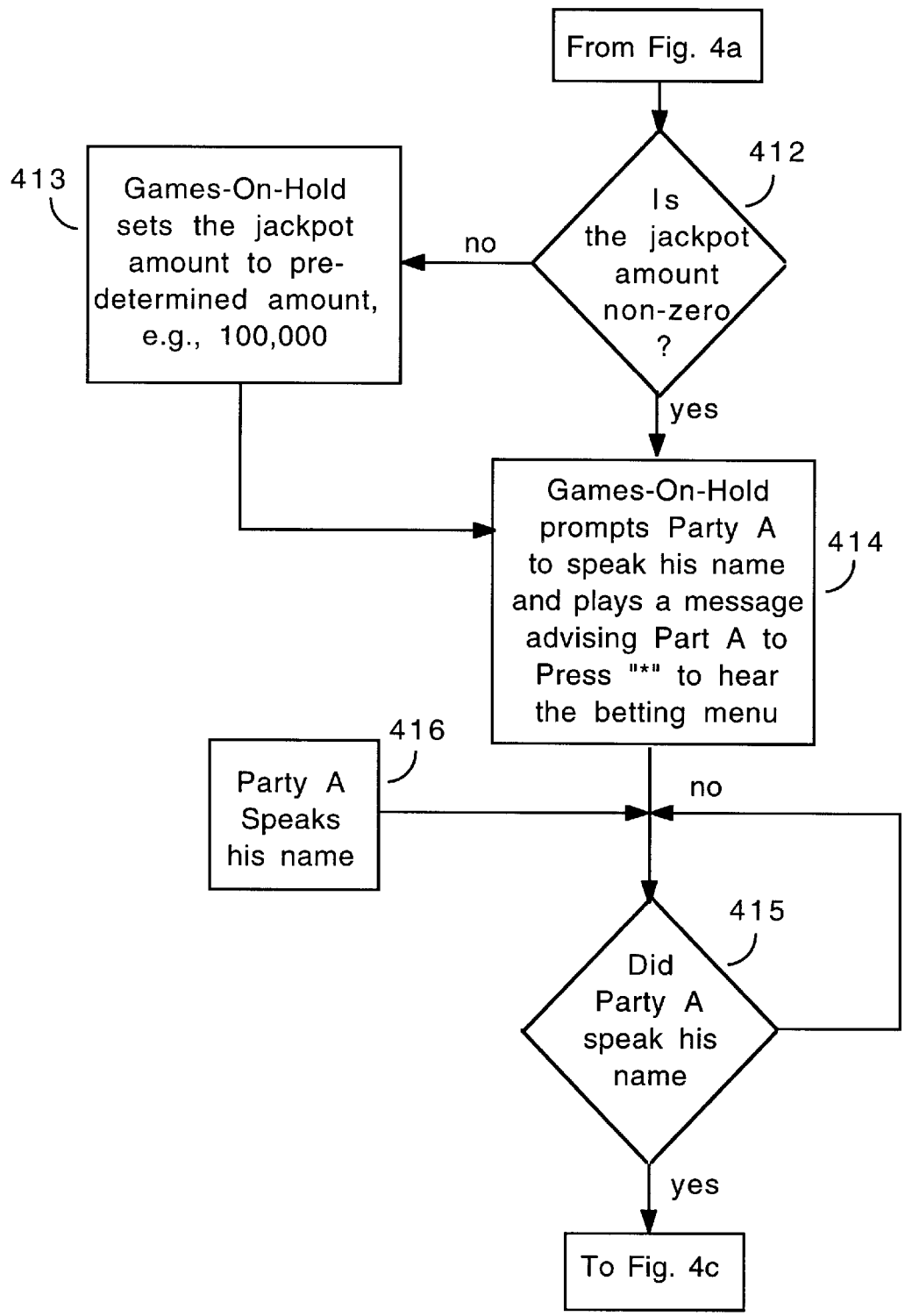

Referring now to FIG. 4b, if the balance assigned to Party A was non-zero, either because a preexisting balance remained assigned to Party A's telephone number, or because games-on-hold software had just now assigned a new balance to Party A, then games-on-hold software retrieves the jackpot amount to determine whether it is non-zero (block 412). If the jackpot amount was not non-zero, i.e., it was in fact zero, then games-on-hold software sets the jackpot amount to a predetermined amount, e.g., 100,000 (block 413). The jackpot amount is now non-zero, either because of a preexisting balance or because of the just now assigned new balance. Games-on-hold software then prompts Party A to speak his name and plays a message advising Party A to press the * (star) button to cause games-on-hold software to play the betting menu to Party A (block 414). Games-on-hold software then waits for Party A to speak his name (block 415) and once Party A does speak his name (block 416), games-on-hold software detects Party A's name in block 415.

Figure 4C:
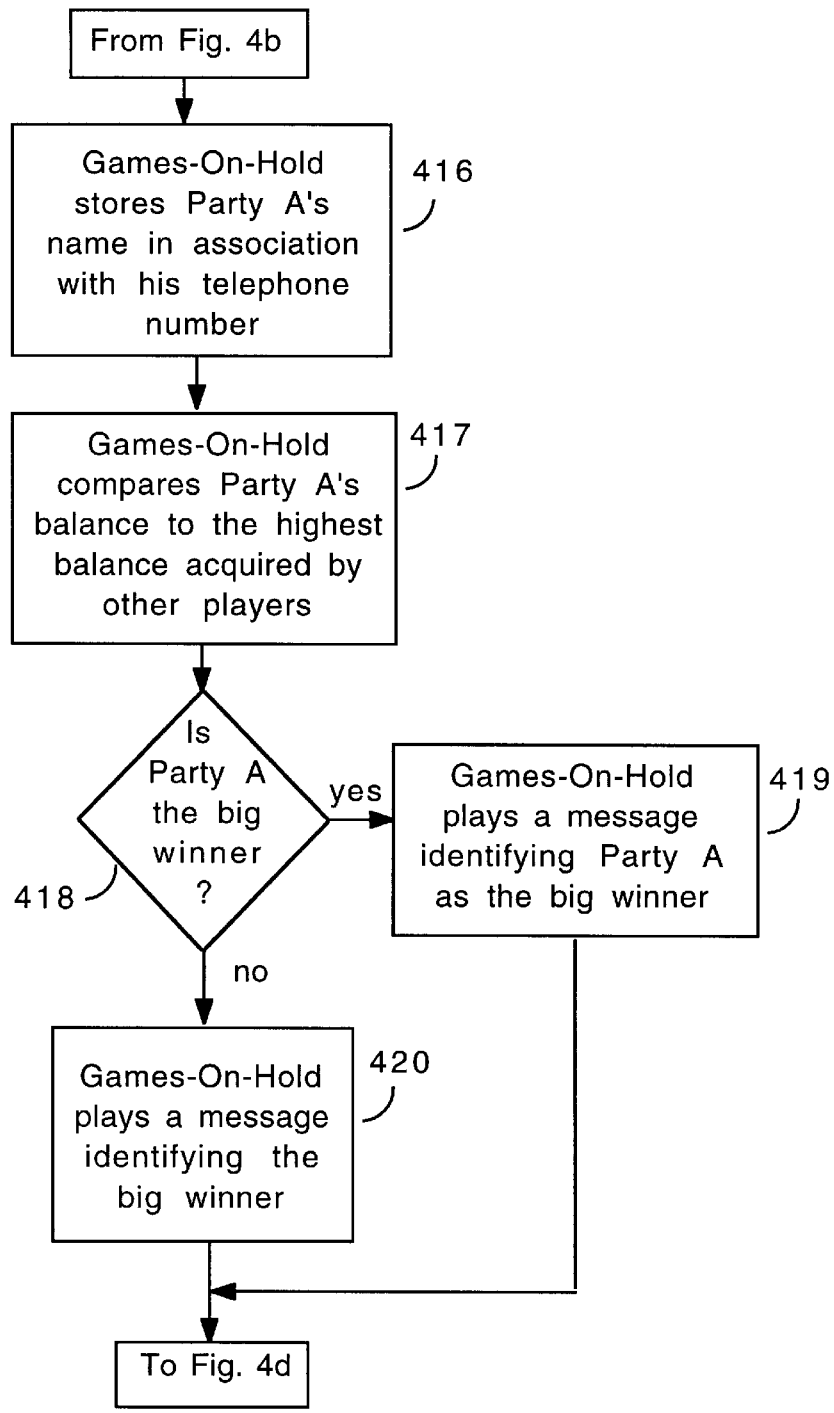

Referring now to FIG. 4c, games-on-hold software stores Party A's name in association with his telephone number (block 416). Games-on-hold software then compares Party A's balance to the highest balance acquired by other players (block 417). If Party A has the highest balance he is determined to be the big winner (block 418) and then games-on-hold software plays a message to all other instances of games-on-hold software identifying Party A as the big winner (block 419). If Party A was not the big winner, games-on-hold software plays a message to Party A identifying the party with the highest balance as the big winner (block 420).

Figure 4D:
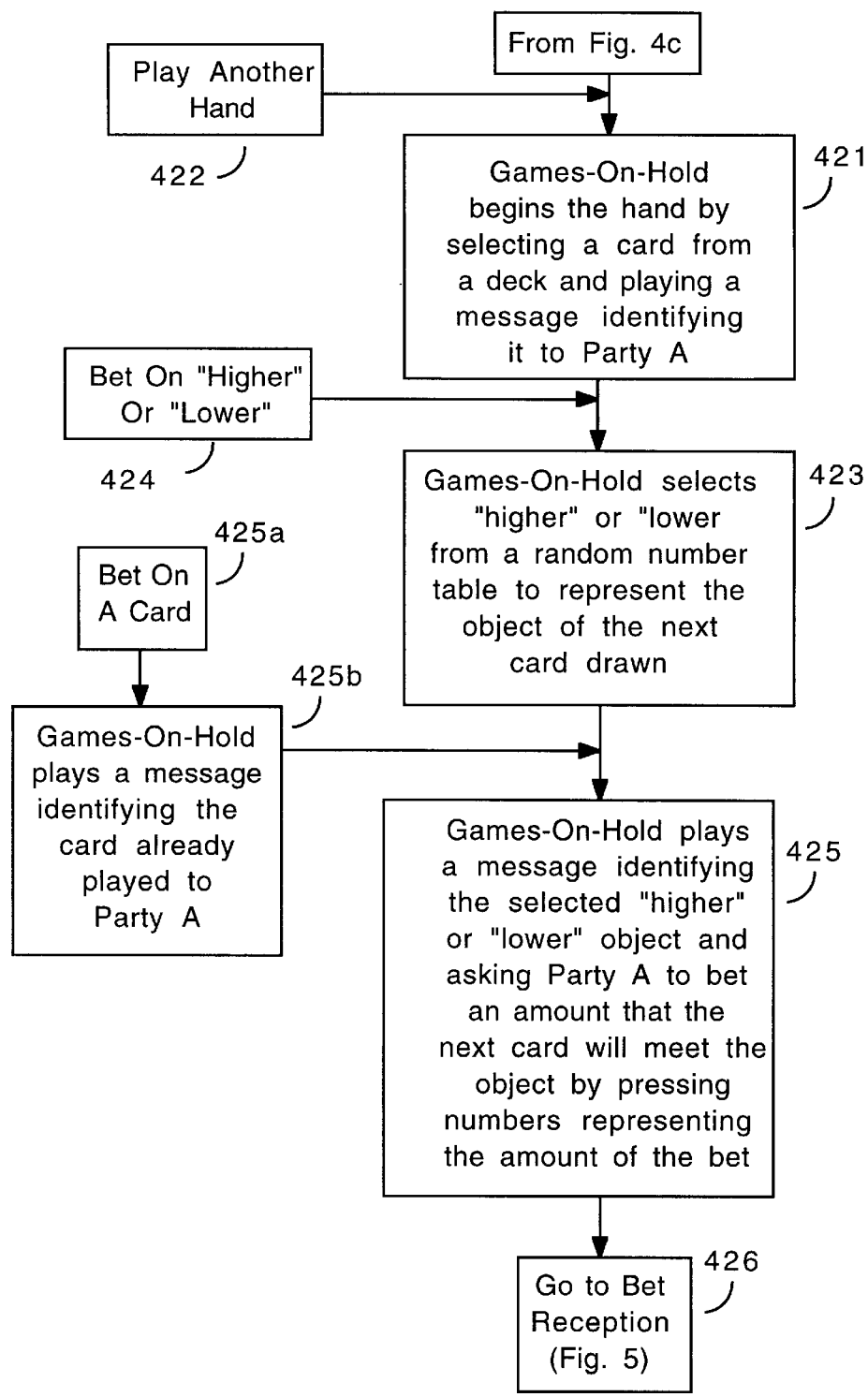

Referring now to FIG. 4d, games-on-hold software begins playing a hand by selecting a card value from a card deck data base and playing a message identifying it to Party A (block 421). This Play Another Hand mode of operation can also be entered from other parts of games-on-hold software at block 422. Games-on-hold software then selects a number representing higher or lower, from a random number table, to represent the object of the next card to be drawn (block 423). This Bet On Higher Or Lower Next Card mode of operation can also be entered from other parts of games-on-hold software at block 424. Games-on-hold software then plays a message identifying whether higher or lower was selected as the object of the next card draw and asks Party A to bet an amount that the next card will meet that object by pressing numbers representing the amount of the bet (block 425). This Bet On A Card mode of operation can also be entered from other parts of games-on-hold software at block 425a. In that case games-on-hold software plays a message to Party A identifying the card already played (block 425b), and then (in block 425) plays the messages identifying the selected higher or lower object and requesting that a bet be made that the next card will meet that object. Games-on-hold software then goes to the Bet Reception mode of operation (block 426).

Figure 5:
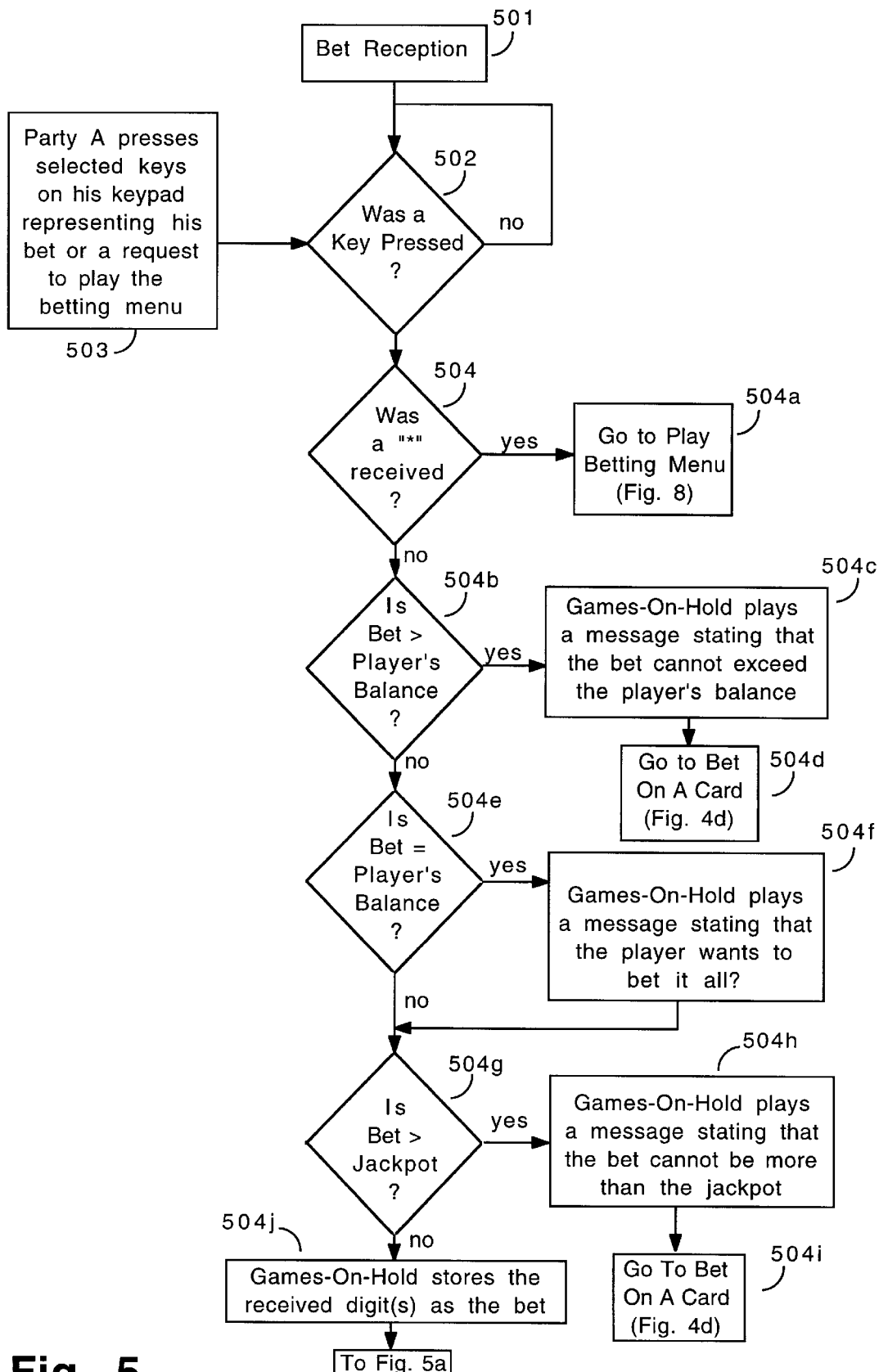

Referring now to FIG. 5, games-on-hold software enters the Bet Reception mode of operation at block 501. In this mode of operation games-on-hold software initially waits for reception of signals representing Party A's bet or a request that the betting menu be played (block 502). When Party A is ready to bet he presses the keys on his keypad that represent the amount of his bet and, alternatively, if he wants the betting menu to be played he presses the "*" keypad (block 503). If a "*" was received (block 504) games-on-hold software goes to the Play Betting Menu mode of operation (block 504a). Games-on-hold software allows a predetermined time for reception of such digits, e.g., four seconds.

If Party A pressed numeric keys representing the amount of his bet, games-on-hold software receives those digits and compares them to the player's (i.e., Party A's) balance and the jackpot amount. If the amount of the bet is greater than the player's balance (block 504b), games-on-hold software plays a message stating that the bet cannot exceed the player's balance (block 504c), and games-on-hold software then goes to the Bet On A Card mode of operation (block 504d). If the amount of the bet equals the player's balance, games-on-hold software plays a message acknowledging that the player wants to bet it all (block 504f). If the amount of the bet is less than or equal to the player's balance (blocks 504b and 504c) games-on-hold software compares it to the jackpot amount (block 504g).

If the amount of the bet is greater than the jackpot amount games-on-hold software plays a message stating that the bet cannot be more than the jackpot (block 504h) and it then goes to the Bet On A Card mode of operation (block 504i). If the amount of the bet is not greater than the jackpot, games-on-hold software stores the received digits as the amount of the bet (block 504j).

Figure 5A:
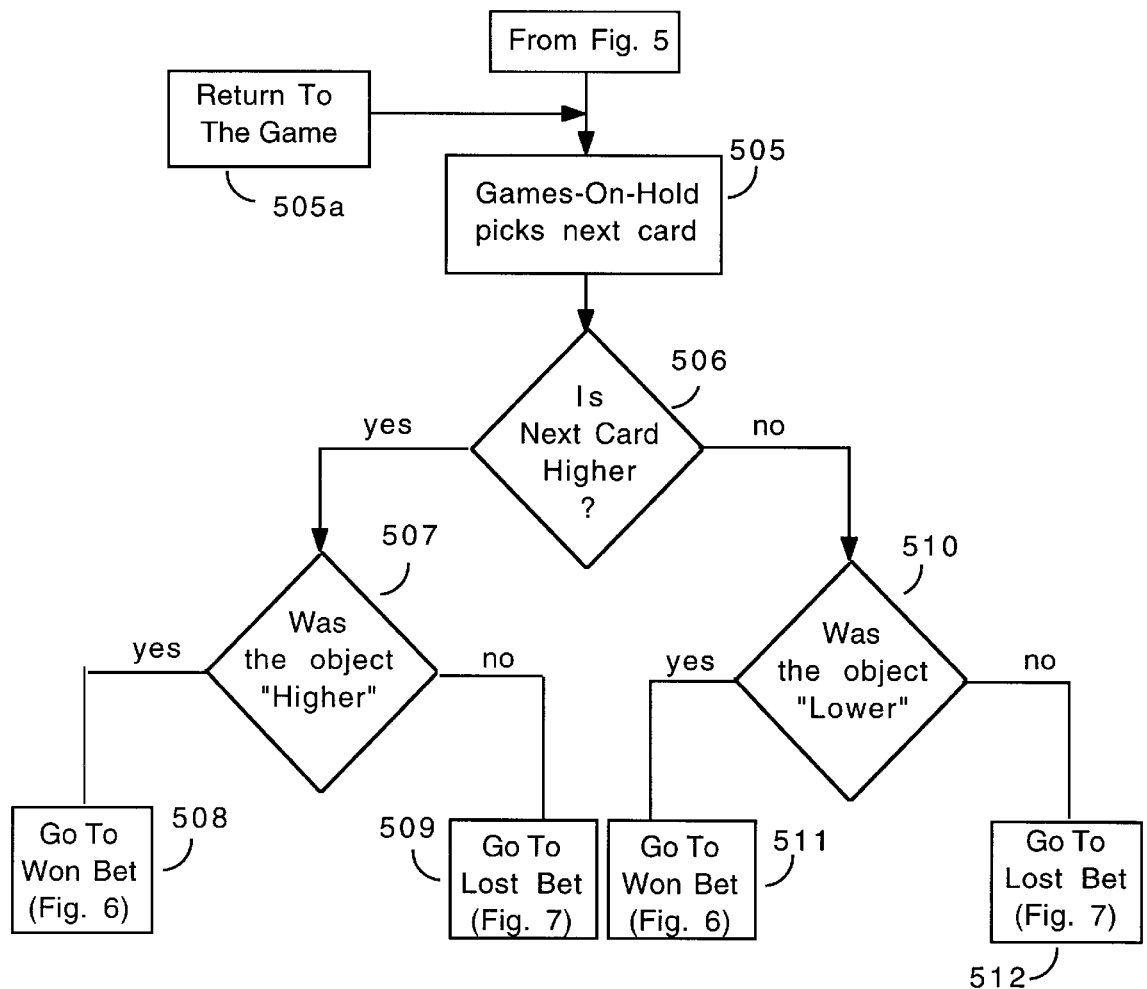

Referring now to FIG. 5a, games-on-hold software then picks a value, representing a card, from a random number table representing the values of the cards in a deck (block 505). This mode of operation can also be entered from other parts of games-on-hold software at block 505a (Return To The Game). The "card" that was picked from the random number table is then compared to the value of the previous card to determine whether it is higher or lower than the previous card (block 506). If the subsequent card is higher, games-on-hold software then retrieves the value of the object, i.e., higher or lower (block 507). If the object was higher, then the player has won the bet since the next card drawn was in fact higher. In this case games-on-hold software goes to the Won Bet mode of operation (block 508). However, if the object was lower, then games-on-hold software goes to the Lost Bet mode of operation (block 509), since the subsequent card drawn was higher while the object was to draw a card that was lower.

Similarly, if the subsequent card drawn was lower, as determined by games-on-hold software in block 506, it then retrieves the value of the object, i.e., higher or lower (block 510). If the object was lower then the player has won and games-on-hold software goes to the Won Bet mode of operation (block 511), since the subsequent card drawn was lower and the object was lower. And, if the object was not lower, as determined by games-on-hold software in block 510, then games-on-hold software goes to the Lost Bet mode of operation (block 512) since the player has lost the bet because the subsequent card drawn was lower but the object was not lower.

Figure 6:
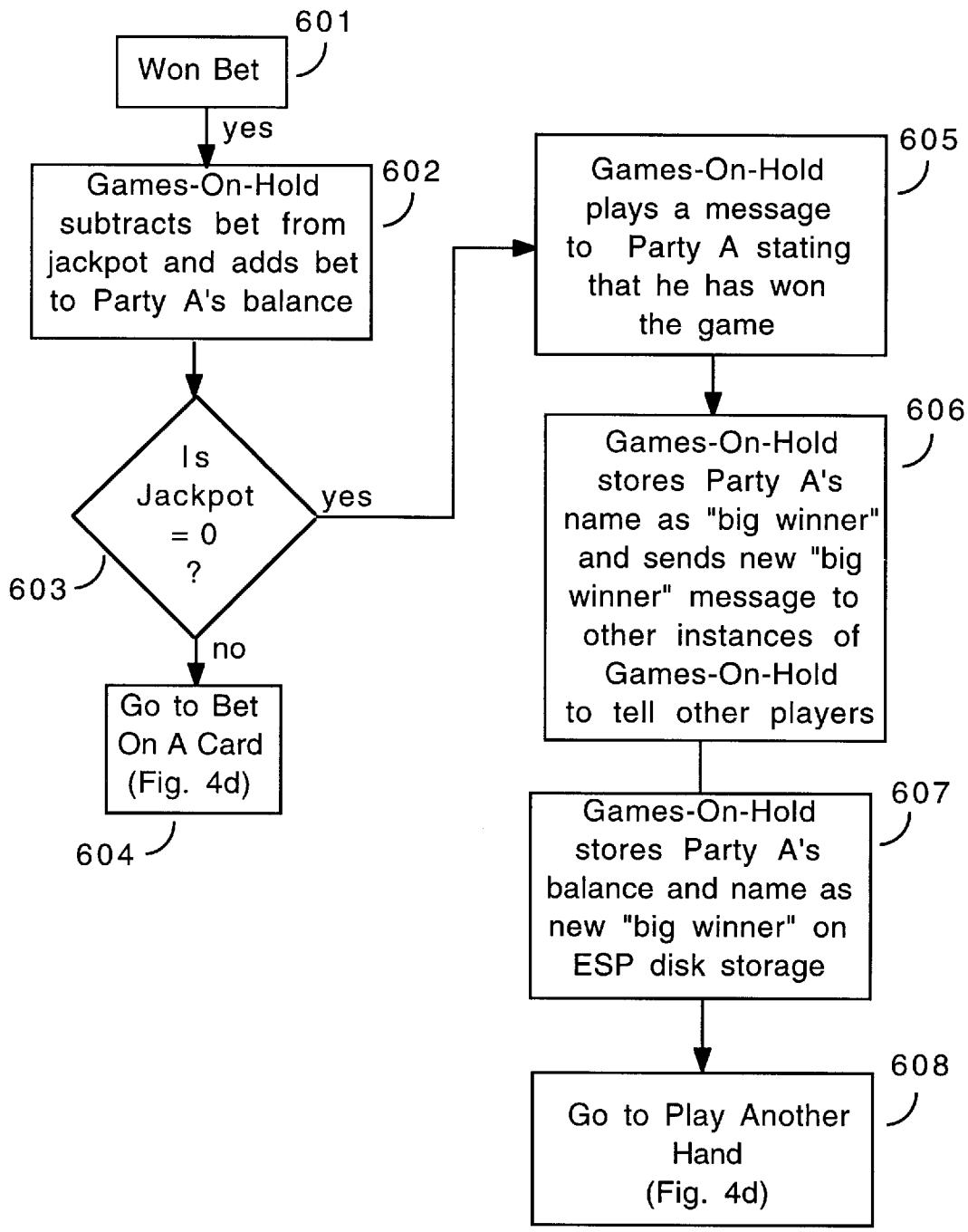

Referring now to FIG. 6, games-on-hold software enters the Won Bet mode of operation at block 601. In this mode of operation games-on-hold software subtracts the amount of the bet from the jackpot and adds the amount of the bet to Party A's balance (block 602). Games-on-hold software then determines whether the jackpot amount has been reduced to zero (block 603). If the jackpot has not been reduced to zero, then games-on-hold software goes to the Bet On A Card mode of operation (block 604). If the jackpot amount had been reduced to zero then games-on-hold software plays a message to Party A stating that he has won the game (block 605). Games-on-hold software then stores Party A's name as the big winner and sends a new big winner message to other instances of games-on-hold software to identify Party A as the new big winner to all other players (block 606). Games-on-hold software then stores Party A's balance and his name as the new big winner on ESP disk storage (block 607). Games-on-hold software then goes to the Play Another Hand mode of operation so that Party A can play a new hand with a new card (block 608).

Figure 7:
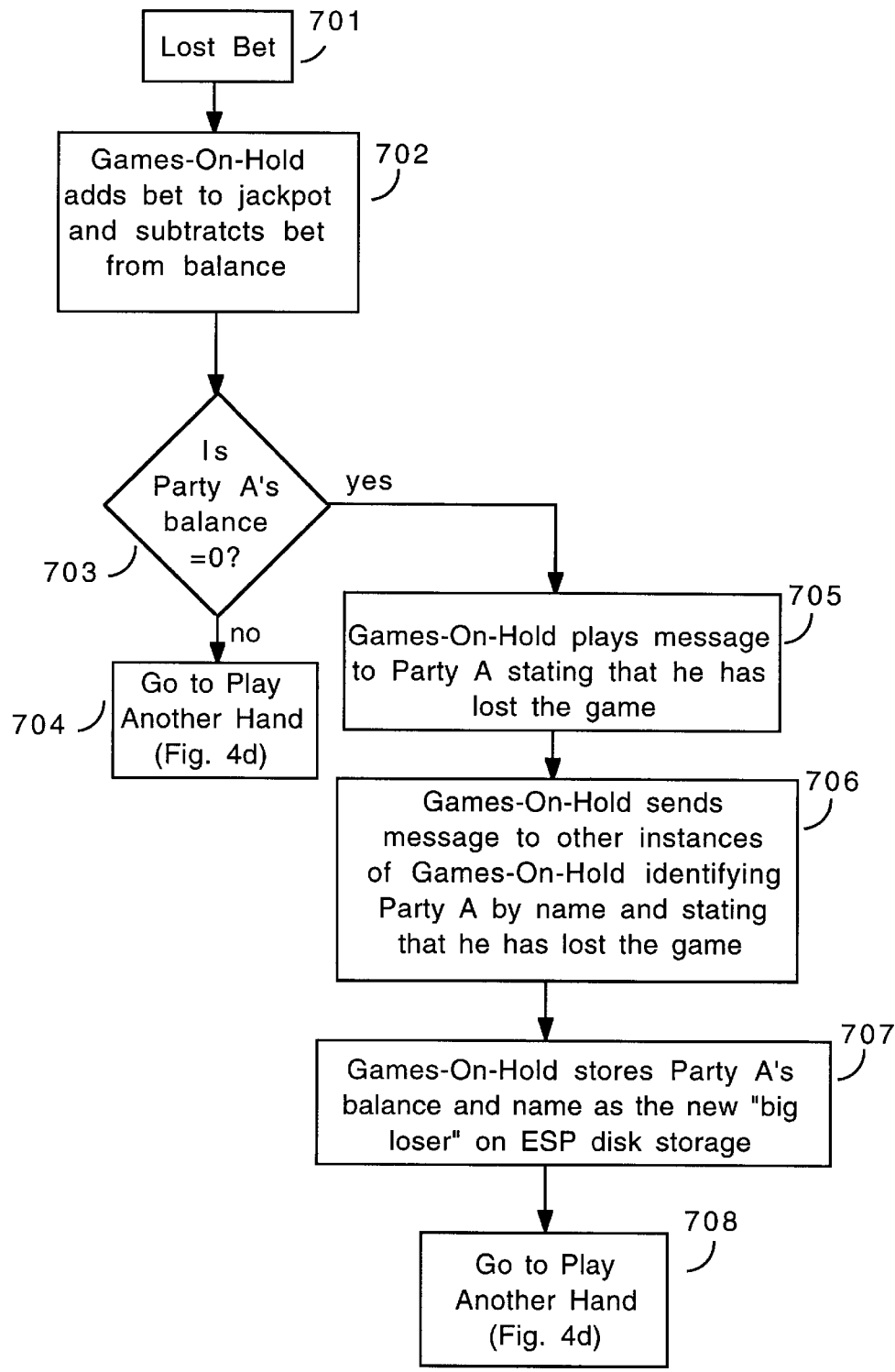

Referring now to FIG. 7, games-on-hold software enters the Lost Bet mode of operation at block 701. In this mode of operation games-on-hold software adds the amount that Party A bet to the jackpot and subtracts the amount of that bet from Party A's balance (block 702). Games-on-hold software then determines whether Party A's balance had been reduced to zero (block 703). If Party A's balance has not been reduced to zero, then games-on-hold software goes to the Bet On A Card mode of operation so that Party A can continue to play this hand (block 704). If Party A's balance had been reduced to zero then games-on-hold software plays a message to Party A stating that he has lost the game (block 705). Games-on-hold software then sends a message to other instances of games-on-hold software identifying Party A by name and stating that he has lost the game (block 706). Games-on-hold software then stores Party A's balance and name as the new big loser in ESP disk storage (block 707).

Games-on-hold software then goes to the Play Another Hand mode of operation (block 708).

Figure 8:
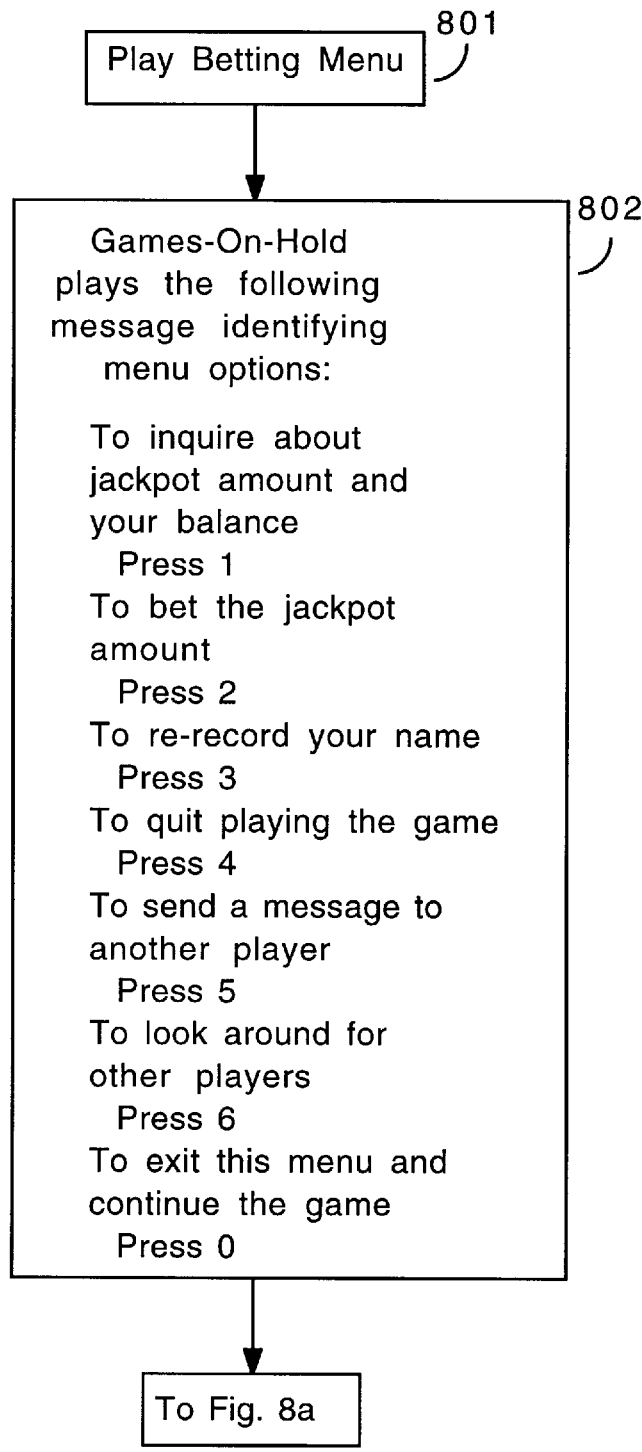

Referring now to FIG. 8, games-on-hold software enters the Play Betting Menu mode of operation at block 801. Party A can cause games-on-hold software to enter this mode of operation at any time by pressing the * (star) button. In this mode of operation games-on-hold software plays a message identifying the following menu operations as being available to the player (block 802):

to inquire about the jackpot amount and the player's balance, press 1;
    to bet the jackpot amount, press 2;
    to rerecord your name, press 3;
    to quit playing the game, press 4;
    to send a message to another player, press 5;
    to look around for other players, press 6;
    to exit this menu and continue the game, press 0.

Figure 8A:
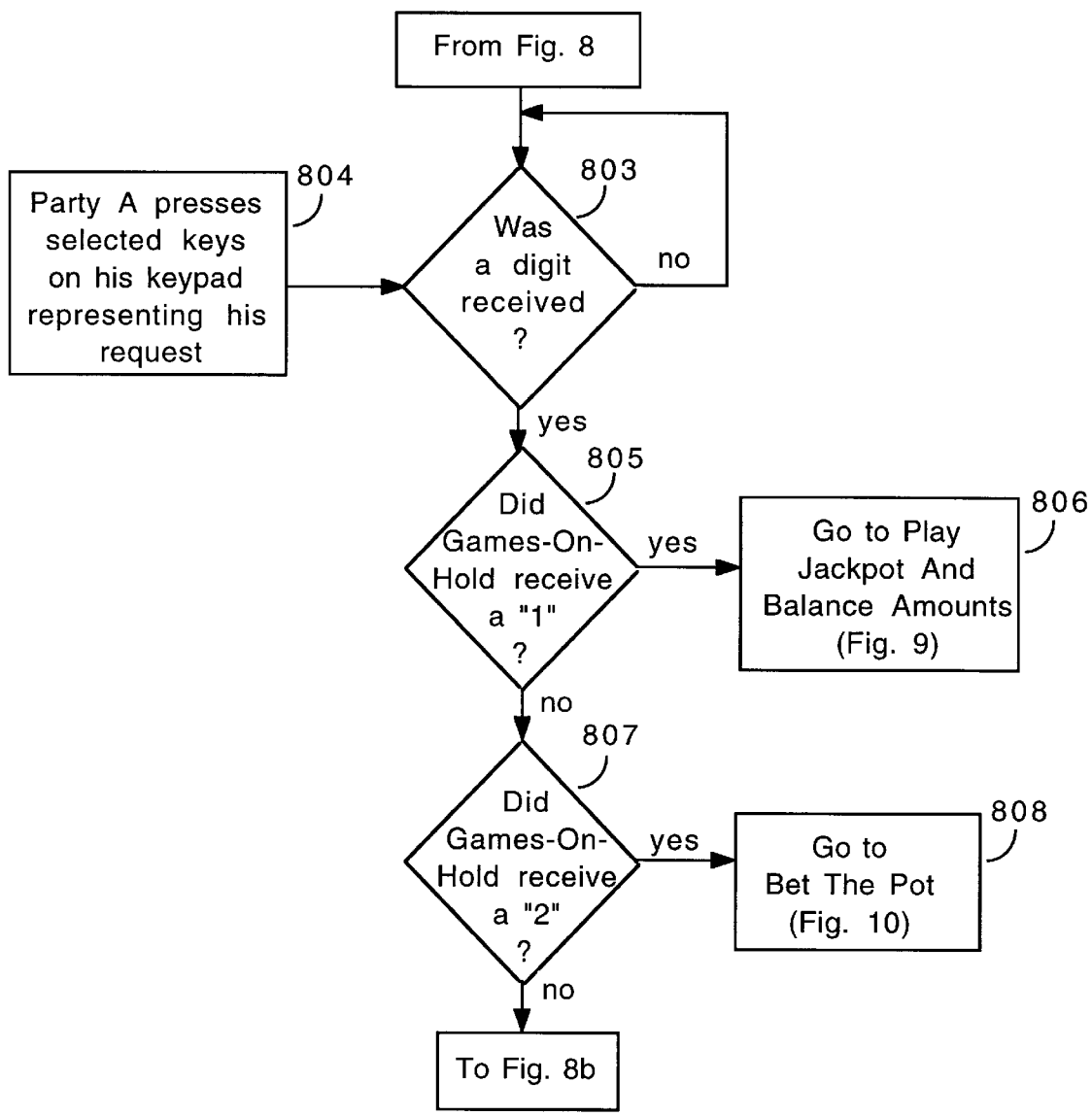

Referring now to FIG. 8a, games-on-hold software waits for a digit to be received representing the menu option selected by the player (block 803). The player, i.e., Party A, then presses selected keys on his key pad representing his menu selection (block 804). If a digit was received (block 803), games-on-hold software compares it to the known acceptable values to determine which digit was received. If a digit value of 1 was received (block 805), games-on-hold software goes to the Play Jackpot And Balance Amounts mode of operation (block 806). If a digit value of 2 was received (block 807), games-on-hold software goes to the Bet The Pot mode of operation (block 808).

Figure 8B:
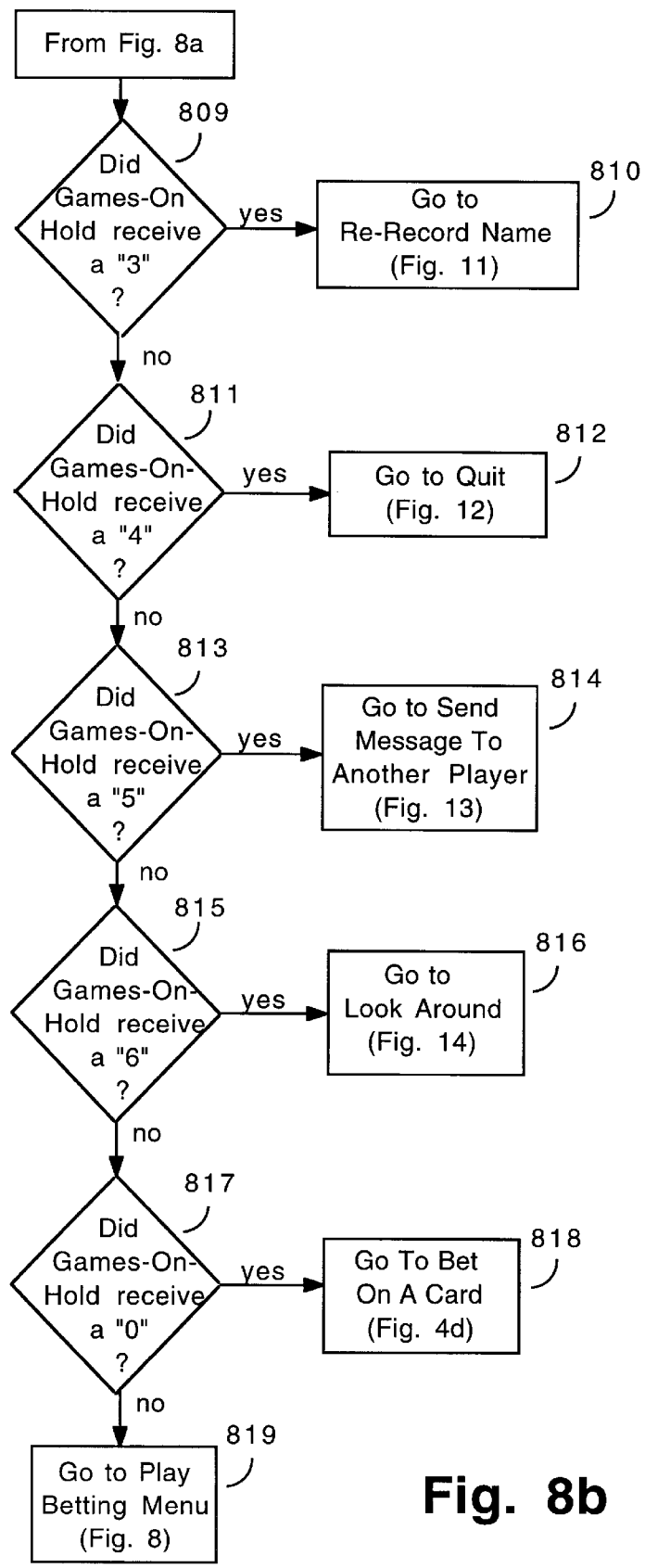

Referring now to FIG. 8b, if a digit value of 3 was received (block 809), games-on-hold software goes to the Re-record Name mode of operation (block 810). If a digit value of 4 was received (block 811), games-on-hold software goes to the Quit mode of operation (block 812). If a digit value of 5 was received (block 813), games-on-hold software goes to the Send Message To Another Player mode of operation (block 814). If a digit value of 6 was received (block 815), games-on-hold software goes to the Look Around mode of operation (block 816). If a digit value of zero was received (block 817), games-on-hold software goes to the Bet On A Card mode of operation (block 818). However, if none of those digits were received, then an invalid digit had been received and games-on-hold software returns to the Play Betting Menu mode of operation to request the player to input a valid digit as identified in the message to be played that indicates the various available menu options.

Figure 9:
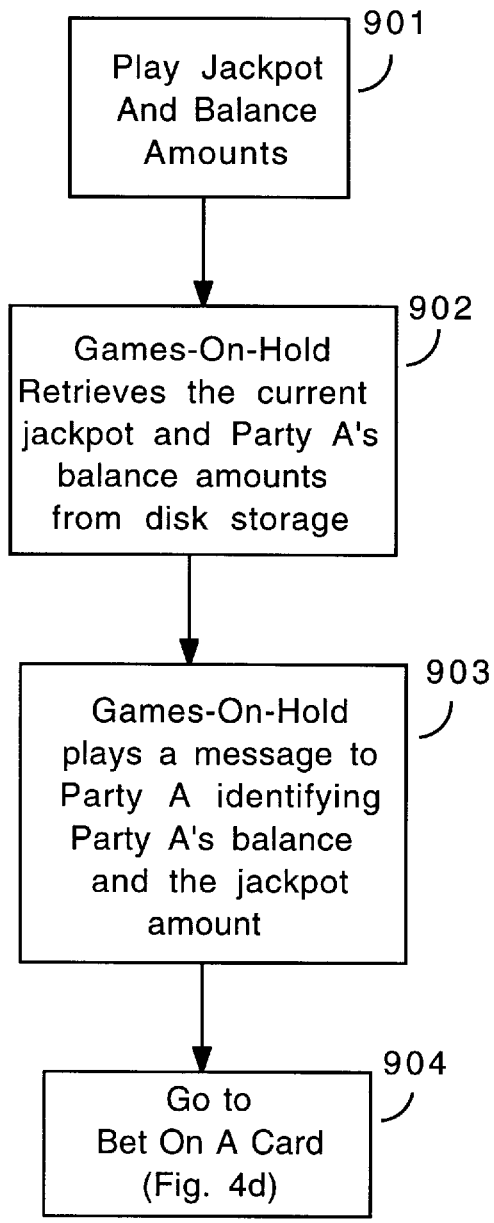

Referring now to FIG. 9, games-on-hold software enters the Play Jackpot And Balance Amounts mode of operation at block 901. In this mode of operation games-on-hold software retrieves the current jackpot amount and Party A's balance amount from storage (block 902). Games-on-hold software then plays a message to Party A identifying his balance amount and the jackpot amount (block 903). Games-on-hold software then goes to the Bet On A Card mode of operation (block 904).

Figure 10:
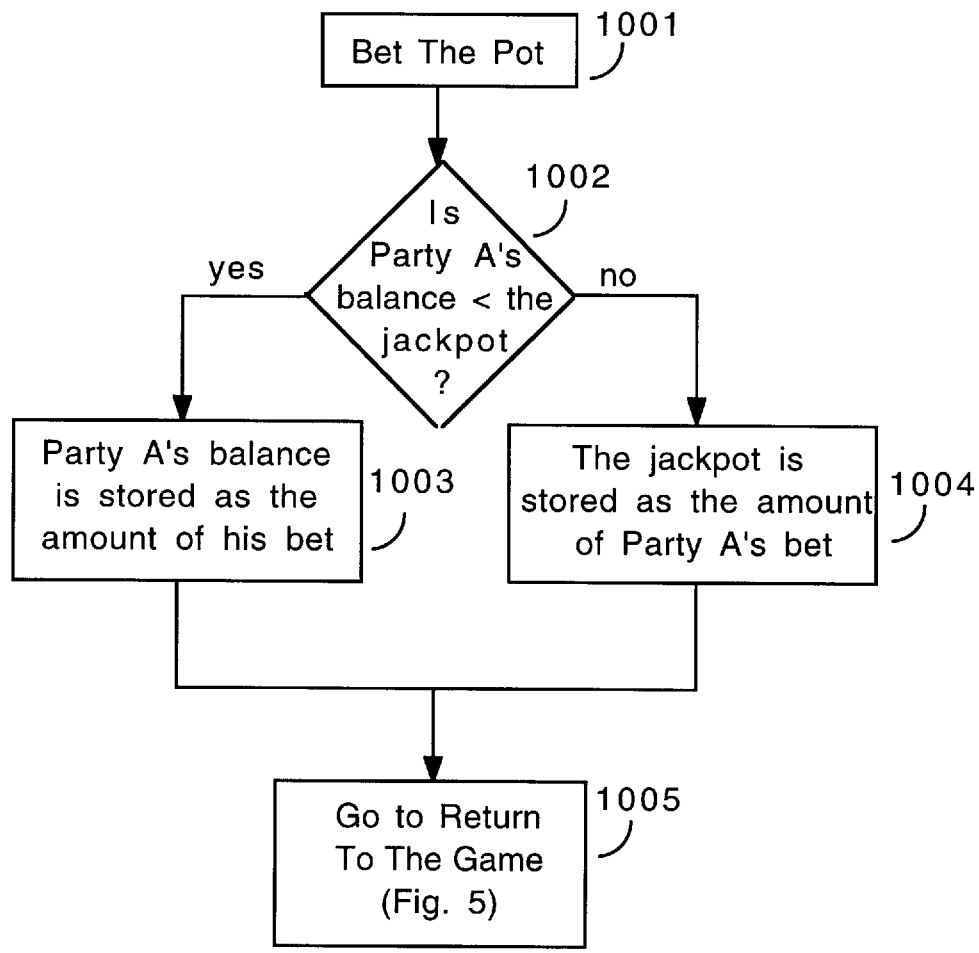

Referring now to FIG. 10, games-on-hold software enters the Bet The Pot mode of operation at block 1001. In this mode of operation games-on-hold software compares Party A's balance to the jackpot amount and if Party A's balance is less than the jackpot (block 1002) games-on-hold software stores Party A's balance as the amount of his bet (block 1003). However, if Party A's balance is not less than the jackpot, then games-on-hold software stores the jackpot as the amount of Party A's bet (block 1004). Games-on-hold software then goes to the Return To The Game mode of operation (block 1005).

Figure 11:
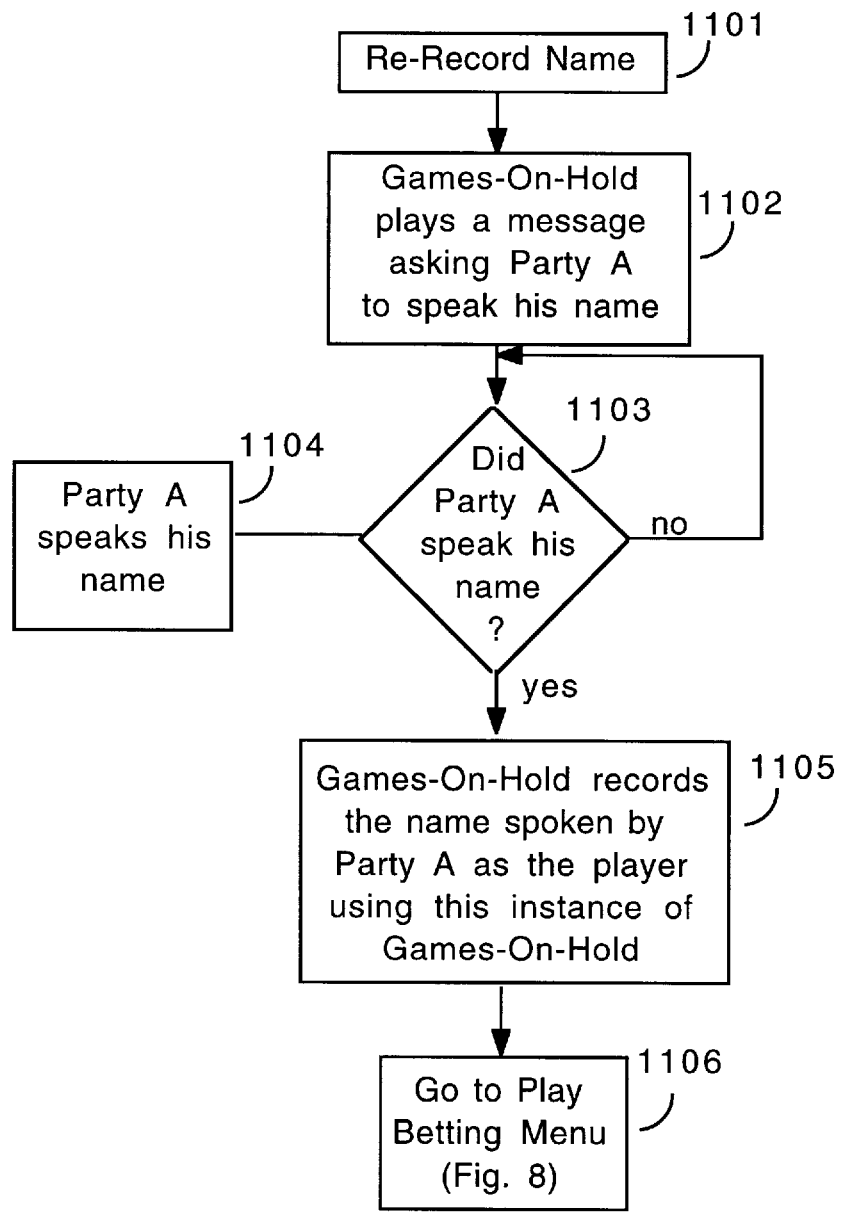

Referring now to FIG. 11, games-on-hold software enters the Re-record Name mode of operation at block 1101. In this mode of operation games-on-hold software plays a message asking Party A to speak his name (block 1102). Games-on-hold software then waits for Party A to speak his name (block 1103). Party A then speaks his name (block 1104) and games-on-hold software detects it in block 1103. Games-on-hold software then records the name spoken by Party A as the player using this instance of games-on-hold software (block 1105). Games-on-hold software then goes to the Bet On A Card mode of operation (block 1106).

Figure 12:
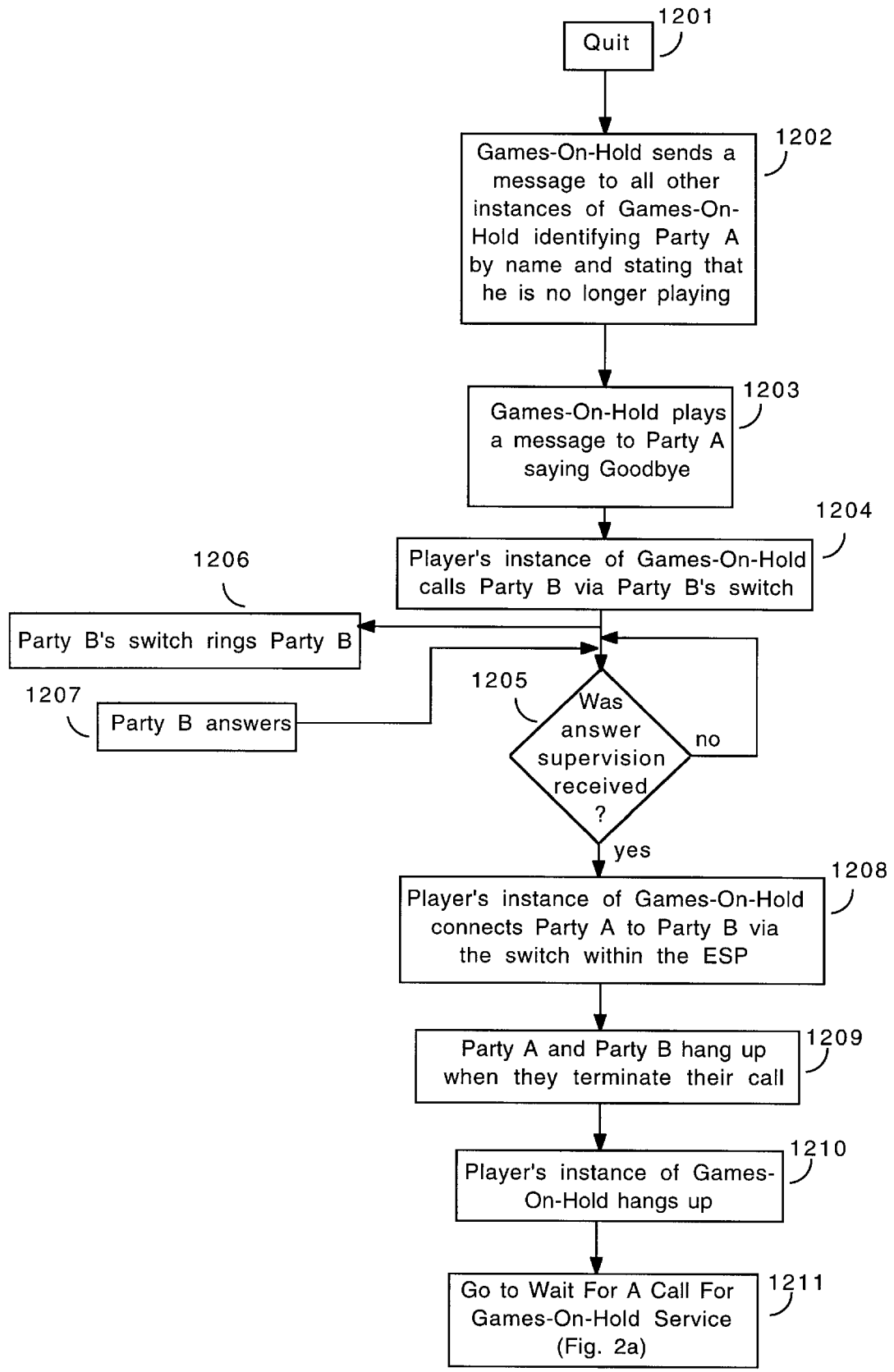

Referring now to FIG. 12, games-on-hold software enters the Quit mode of operation at block 1201. In this mode of operation games-on-hold software sends a message to all other instances of games-on-hold software, identifying Party A by name and stating that he is no longer playing games-on-hold (block 1202). Games-on-hold software then plays a message to Party A saying "goodbye" (block 1203). The player's instance of games-on-hold software then calls Party B via Party B's switch (block 1204) and it then waits for receipt of answer supervision (block 1205). Party B's switch then rings Party B (block 1206) and Party B subsequently answers (block 1207), causing Party B's switch to send answer supervision to the ESP. When the player's instance of games-on-hold software detects answer supervision (block 1205) it connects Party A to Party B via the switch within the ESP (block 1208). Party A and Party B then communicate with each other and ultimately hang up when they terminate their call (block 1209). The player's instance of games-on-hold software then also hangs up (block 1210). The player's instance of games-on-hold software then goes to the Wait For A Call For Games-On-Hold Service mode of operation (block 1211).

Figure 13:
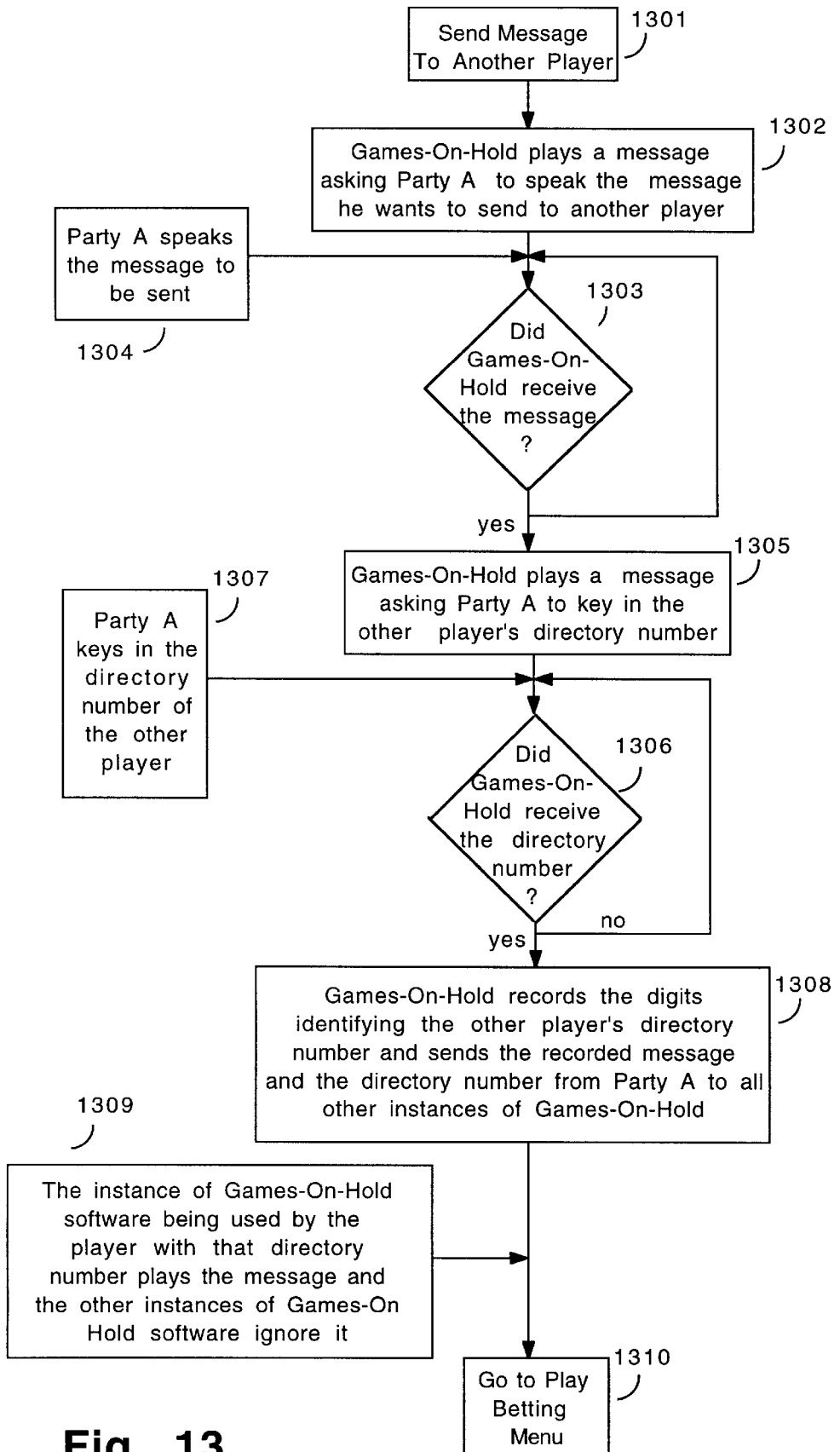

Referring now to FIG. 13, games-on-hold software enters the Send Message To Another Player mode of operation at block 1301. In this mode of operation games-on-hold software plays a message asking Party A to speak the message he wants to send to another player (block 1302). Games-on-hold software then waits for receipt of the message (block 1303). Party A then speaks the message to be sent to a specific player (block 1304). Games-on-hold software then receives the message from Party A (block 1303) and then records it and plays a message asking Party A to key in the other player's directory number (block 1305). Games-on-hold software then waits for receipt of the directory number (block 1306). Party A then keys in the directory number of the other player he wishes to send the message to (block 1307). Games-on-hold software then receives the digits from Party A identifying the other player's directory number (block 1306), and records that number and sends that directory number and the previously recorded message from Party A to all other instances of games-on-hold software (block 1308). The other instances of games-on-hold software receive the message and directory number but only that instance of games-on-hold software being used by the player with that directory number, plays the message to the associated player and the other instances of games-on-hold software ignore the message (block 1309). Party A's instance of games-on-hold software then goes to the Play Betting Menu mode of operation (block 1310).

Figure 14:
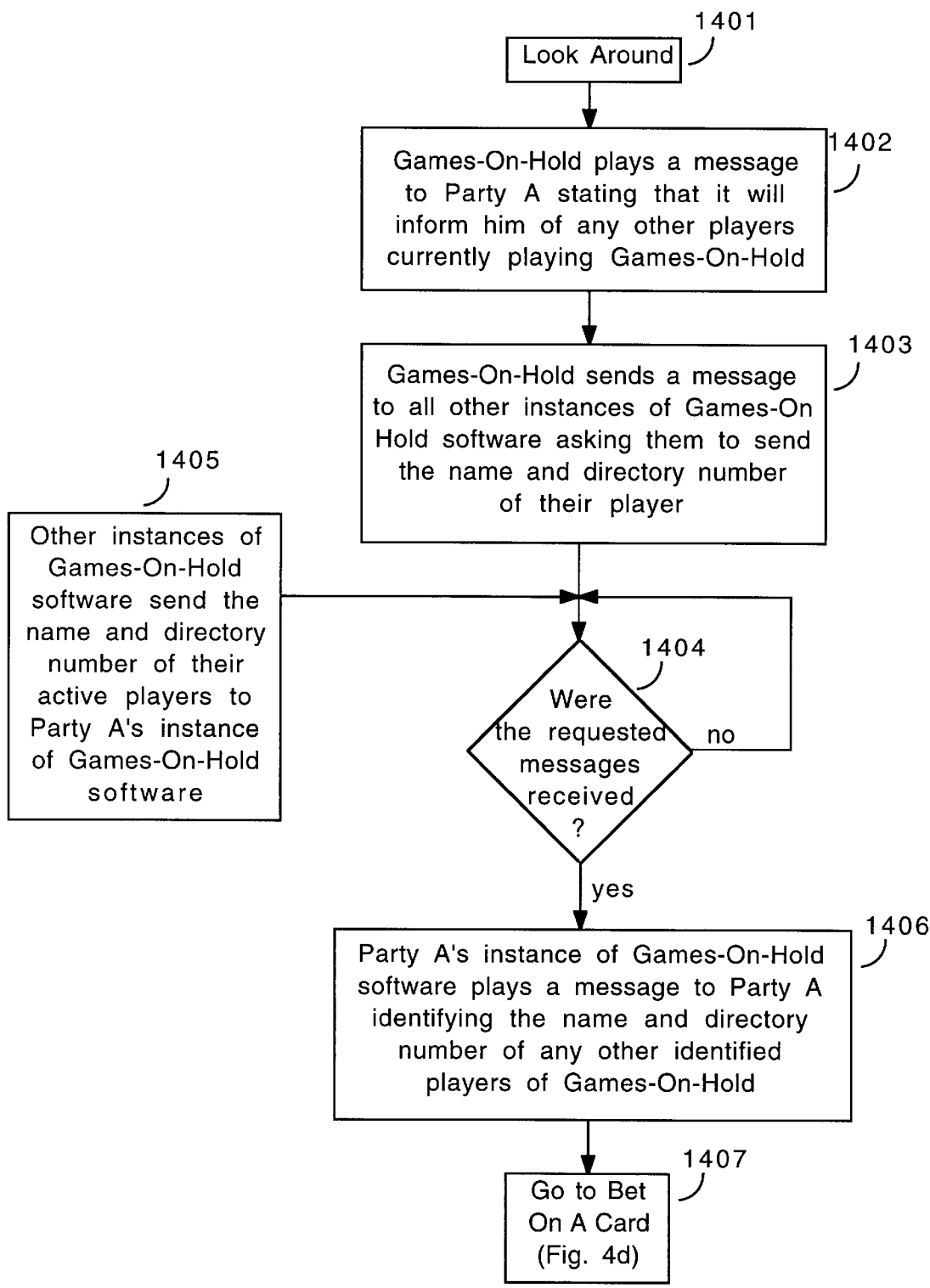

Referring now to FIG. 14, games-on-hold software enters the Look Around mode of operation at block 1401. In this mode of operation games-on-hold software plays a message to Party A stating that it will inform him of any other players currently playing games-on--hold (block 1402). Games-on-hold software then sends a message to all other instances of games-on-hold software asking them to send the name and directory number of their player to Party A's instance of games-on-hold software (block 1403). Party A's instance of games-on-hold software then waits for the messages from the other instances of games-on-hold software (block 1404). The other instances of games-on-hold software then send the name and directory number of their associated player, if any, to Party A's instance of games-on-hold software (block 1405). When Party A's instance of games-on-hold software receives those messages (block 1404) it plays a message to Party A identifying the name and directory number of the other identified players of games-on-hold (block 1406). Games-on-hold software then goes to the Bet On A Card mode of operation (block 1407).

The foregoing options, i.e., Bet The Jackpot, Rerecord Your Name, Quit Playing The Game, Send A Message To Another Player, Look Around For Another Player, and Exit Menu And Return To The Game, were available to the player while in the Activate Games-On-Hold mode of service. The remaining modes of operation, i.e., Record A Custom Message For Player, Retrieve Player When He's Ready, and Retrieve Player Now are the other modes of operation that are available to Party B, besides Activate Games-On-Hold.

Figure 15:
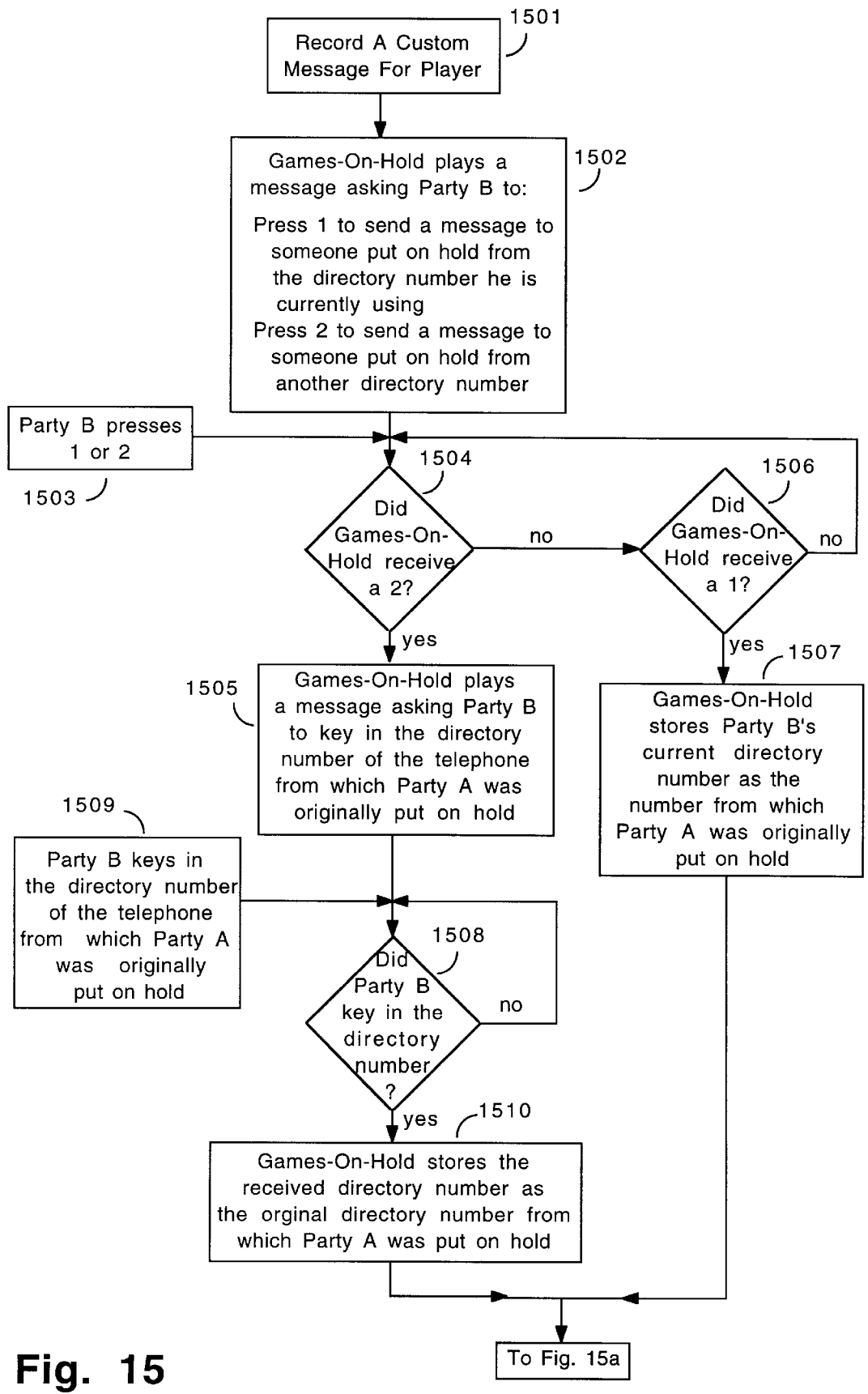

Referring now to FIG. 15, games-on-hold software enters the Record A Custom Message For Player mode of operation at block 1501. Games-on-hold software then plays a message asking Party B to:

press 1 to send a message to someone he put on hold from the directory number he is currently using; or press 2 to send a message to someone he put on hold from another directory number (block 1502).

Games-on-hold software then waits for receipt of the number pressed by Party B. In response to the message played by games-on-hold software, Party B then presses a 1 or a 2 in accordance with the option he selected from the message played by games-on-hold software (block 1503).

If games-on-hold software receives a 2, as pressed by Party B (block 1504), games-on-hold software then plays a message asking Party B to key in the directory number of the telephone from which Party A was originally put on hold (block 1505). And, if games-on-hold software receives a 1, as pressed by Party B (block 1506), games-on-hold software stores Party B's current directory number as the number from which Party A was originally put on hold (block 1507). Once games-on-hold software plays the message requesting Party B to key in the directory number of the telephone from which Party A was originally put on hold (block 1505) it then waits for Party B to key in that directory number (block 1508). Party B then keys in the directory number of the telephone from which Party A was originally placed on hold (block 1509). Once games-on-hold software receives the telephone number keyed in by Party B (block 1509) it then stores that directory number as the original directory number from which Party A was put on hold (block 1510).

Figure 15A:
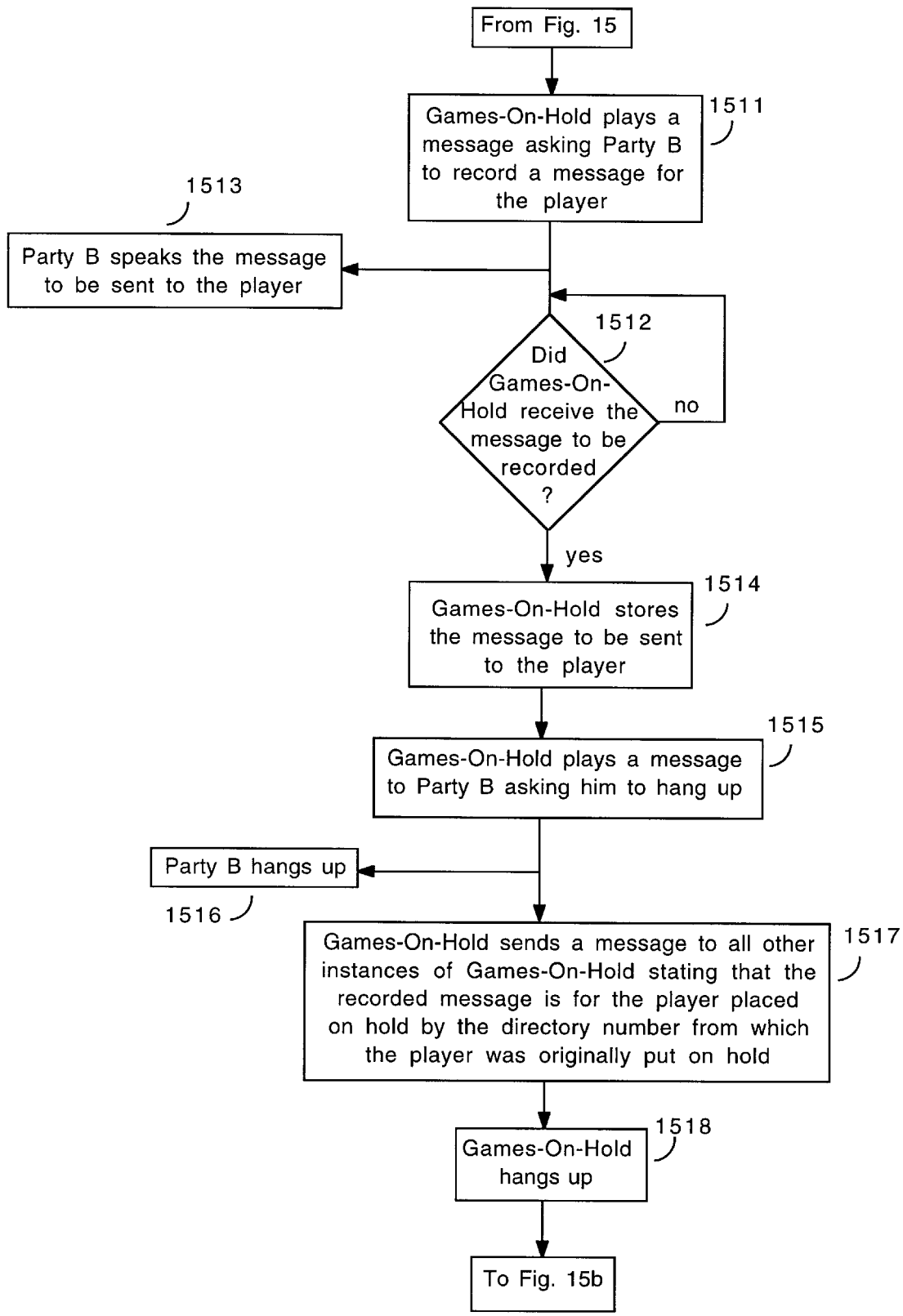

Referring now to FIG. 15*a*, games-on-hold software then plays a message asking Party B to record the message he wants games-on-hold software to send to the other party, i.e., the player, Party A (block 1511). Games-on-hold software then waits for Party B to speak his message (block 1512). Party B then speaks his message (block 1513) and when games-on-hold software receives that message Party B (block 1512) it stores it for subsequent transmission to the player (block 1514). Games-on-hold software then plays a message to Party B asking him to hang up (block 1515). Party B then hangs up (block 1516), and games-on-hold software sends a message to all other instances of games-on-hold software stating that the recorded message being transferred to all such instances is for the player placed on hold by the directory number from which the player was originally put on hold (block 1517). That directory number and the name of Party B are also transferred to all such instances of games-on-hold software in the same message. Games-on-hold software then hangs up (block 1518).

Figure 15B:
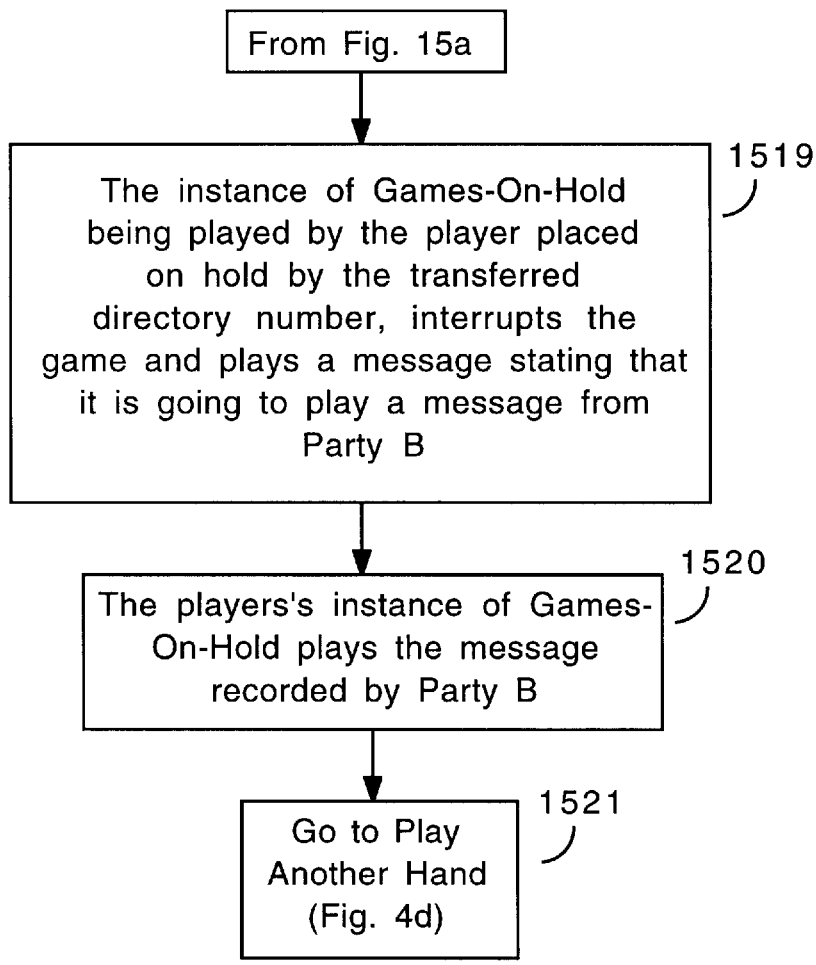

Referring now to FIG. 15*b*, the instance of games-on-hold software being played by the player placed on hold by the so transferred directory number, interrupts the game being played by that player, and plays a message stating that it is going to play a message from Party B, who is identified by name, (block 1519). The instance of games-on-hold software being played by that player, i.e, the player's instance of games-on-hold, then plays the message recorded by Party B (block 1520). The player's instance of games-on-hold software then goes to the Play Another Hand mode of operation (block 1521).

Figure 16:
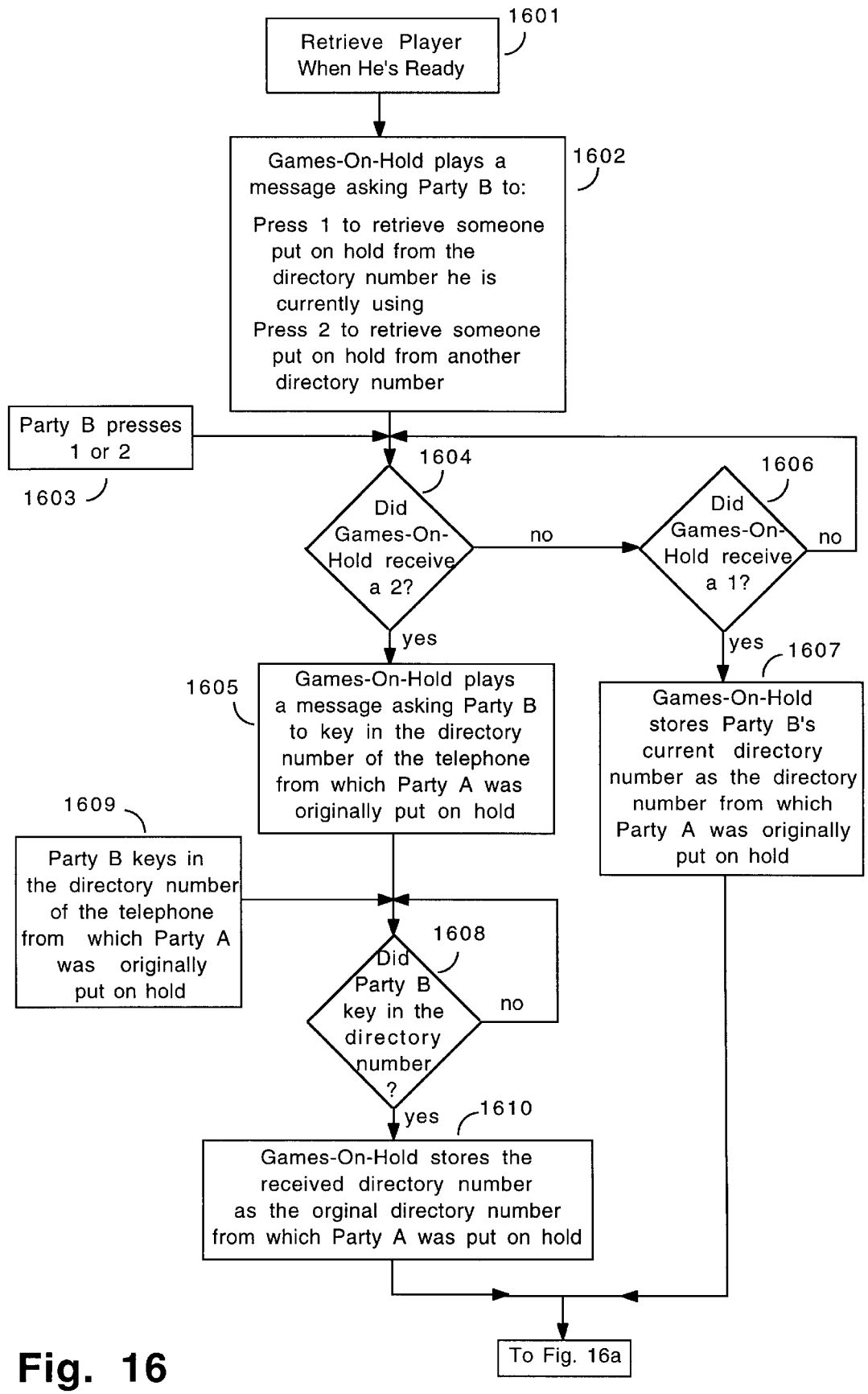

Referring now to FIG. 16, games-on-hold software enters the Retrieve Player When He's Ready mode of operation at block 1601. Games-on-hold software then plays a message asking Party B to:

press 1 to retrieve someone put on hold from the directory number he is currently using; or press 2 to retrieve someone put on hold from another directory number (block 1602).

Games-on-hold software then waits for receipt of the number pressed by Party B. In response to the message played by games-on-hold software, Party B then presses a 1 or a 2 in accordance with the option he selected from the message played by games-on-hold software (block 1603).

If games-on-hold software receives a 2, as pressed by Party B (block 1604), games-on-hold software then plays a message asking Party B to key in the directory number of the telephone from which Party A was originally put on hold (block 1605). And, if games-on-hold software receives a 1, as pressed by Party B (block 1606), games-on-hold software stores Party B's current directory number as the number from which Party A was originally put on hold (block 1607). Once games-on-hold software plays the message requesting Party B to key in the directory number of the telephone from which Party A was originally put on hold (block 1605) it then waits for Party B to key in that directory number (block 1608). Party B then keys in the directory number of the telephone from which Party A was originally placed on hold (block 1609). Once games-on-hold software receives the telephone number keyed in by Party B (block 1609) it then stores that directory number as the original directory number from which Party A was put on hold (block 1610).

Figure 16A:
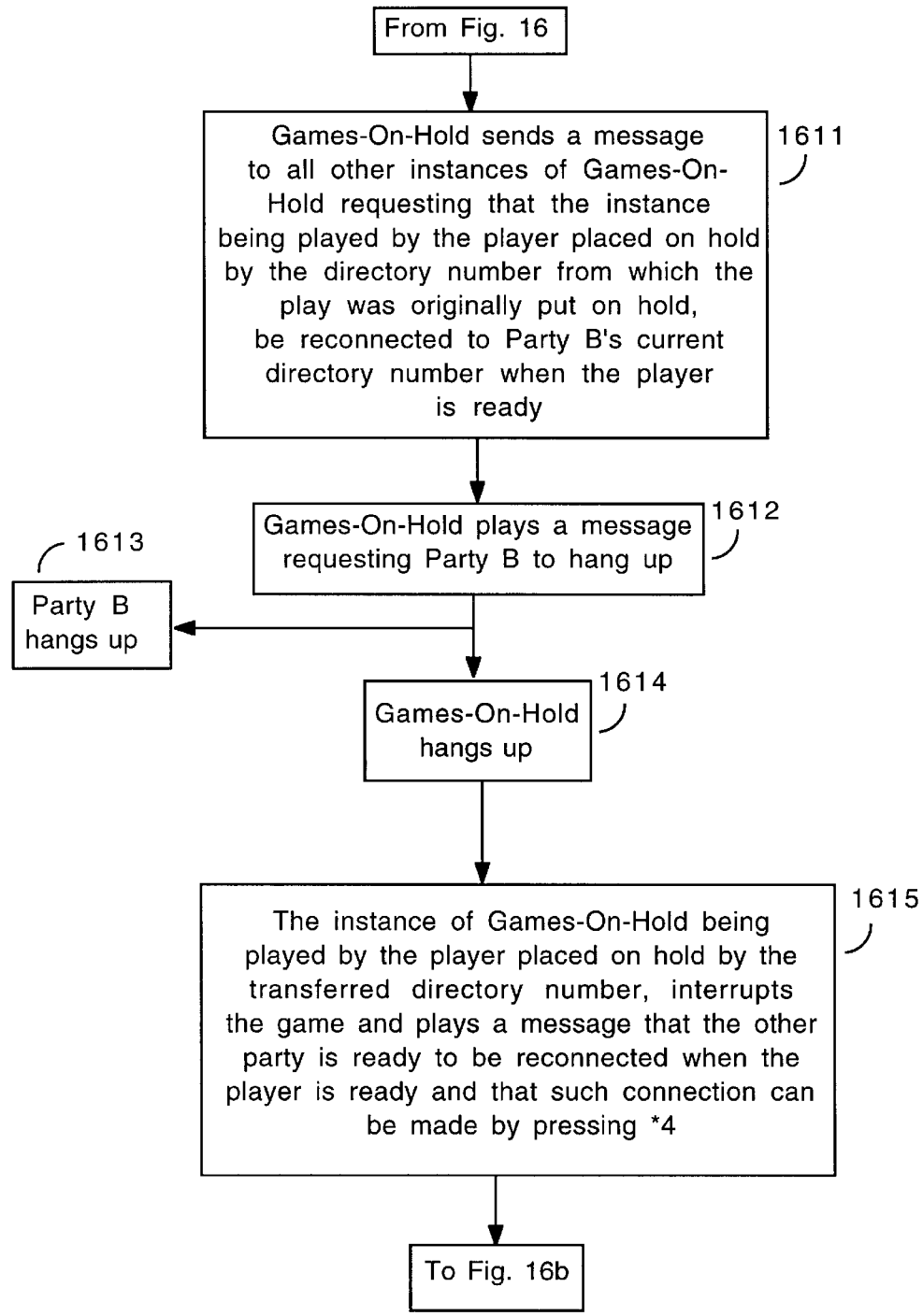

Referring now to FIG. 16*a*, games-on-hold software sends a message to all other instances of games-on-hold software requesting that the instance of games-on-hold being played by the player placed on hold from the directory number from which the player was originally put on hold, be reconnected to Party B's current directory number when the player is ready to be reconnected (block 1611). That directory number and the name of Party B is also transferred to all such instances of games-on-hold software in the same message. Games-on-hold software then plays a message requesting Party B to hang up (block 1612). Party B then hangs up (block 1613) and games-on-hold hangs up (block 1614). The instance of games-on-hold software being played by the player placed on hold by the transferred directory number, i.e., player's instance of games-on-hold, then interrupts the game being played by that player, i.e., Party A. The player's instance of games-on-hold then plays a message that the other party, i.e., Party B, who is identified by name, is ready to be reconnected when the player is ready and that such connection can be made by pressing * (star) 4 (block 1615).

Figure 16B:
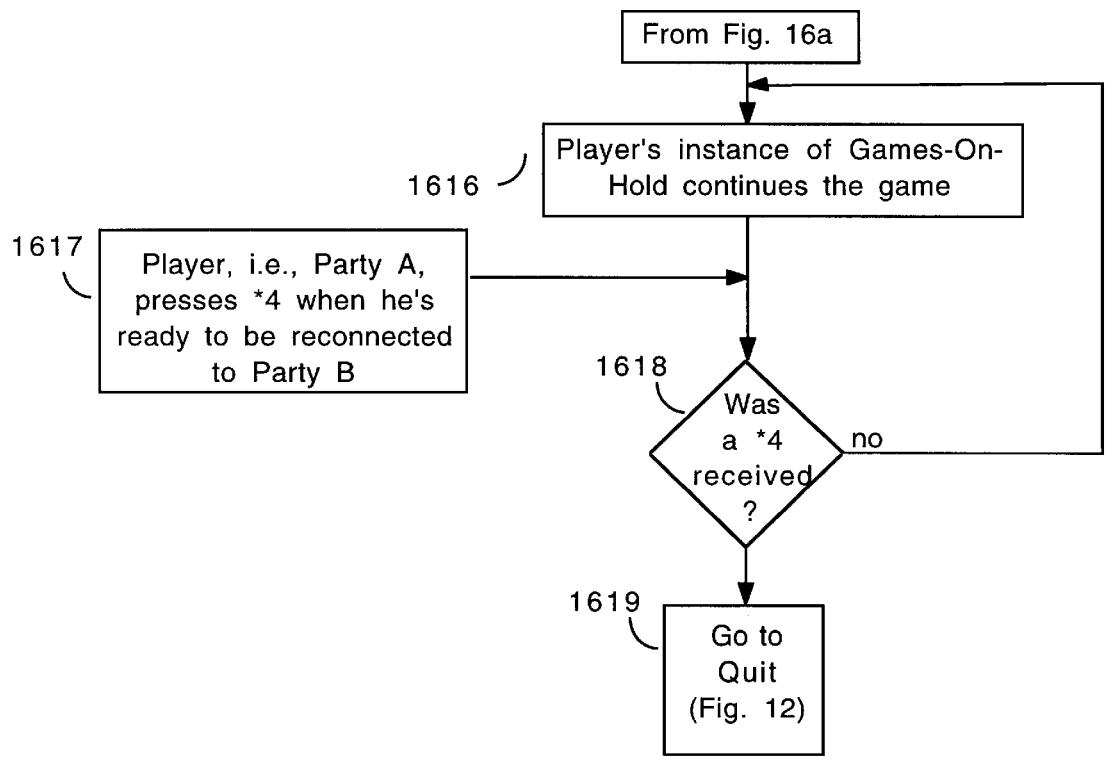

Referring now to FIG. 16b, the player's instance of games-on-hold software continues the game (block 1616). When the player, i.e., Party A, is ready to be reconnected to Party B, he presses * (star) 4 (block 1617). When the player's instance of games-on-hold software detects receipt of the * 4 characters (block 1618), it goes to the Quit mode of operation (block 1619).

Figure 17:
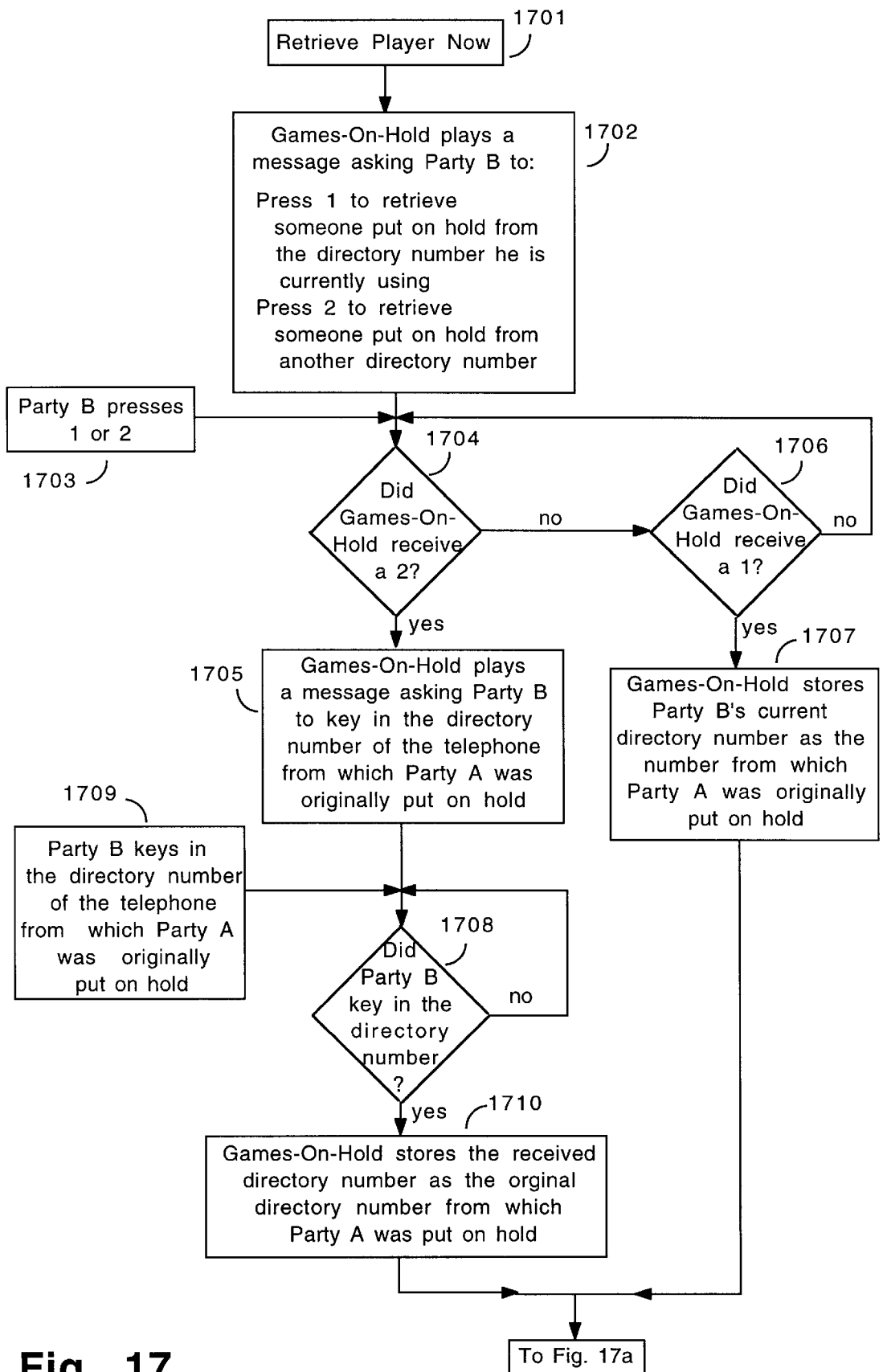

Referring now to FIG. 17 games-on-hold software enters the Retrieve Player Now mode of operation at block 1701. Games-on-hold software then plays a message asking Party B to:

press 1 to retrieve someone put on hold from the directory number he is currently using; or press 2 to retrieve someone put on hold from another directory number (block 1702).

Games-on-hold software then waits for receipt of the number pressed by Party B. In response to the message played by games-on-hold software, Party B then presses a 1 or a 2 in accordance with the option he selected from the message played by games-on-hold software (block 1703).

If games-on-hold software receives a 2, as pressed by Party B (block 1704), games-on-hold software then plays a message asking Party B to key in the directory number of the telephone from which Party A was originally put on hold (block 1705). And, if games-on-hold software receives a 1, as pressed by Party B (block 1706), games-on-hold software stores Party B's current directory number as the number from which Party A was originally put on hold (block 1707). Once games-on-hold software plays the message requesting Party B to key in the directory number of the telephone from which Party A was originally put on hold (block 1705) it then waits for Party B to key in that directory number (block 1708). Party B then keys in the directory number of the telephone from which Party A was originally placed on hold (block 1709). Once games-on-hold software receives the telephone number keyed in by Party B (block 1709) it then stores that directory number as the original directory number from which Party A was put on hold (block 1710).

Figure 17A:
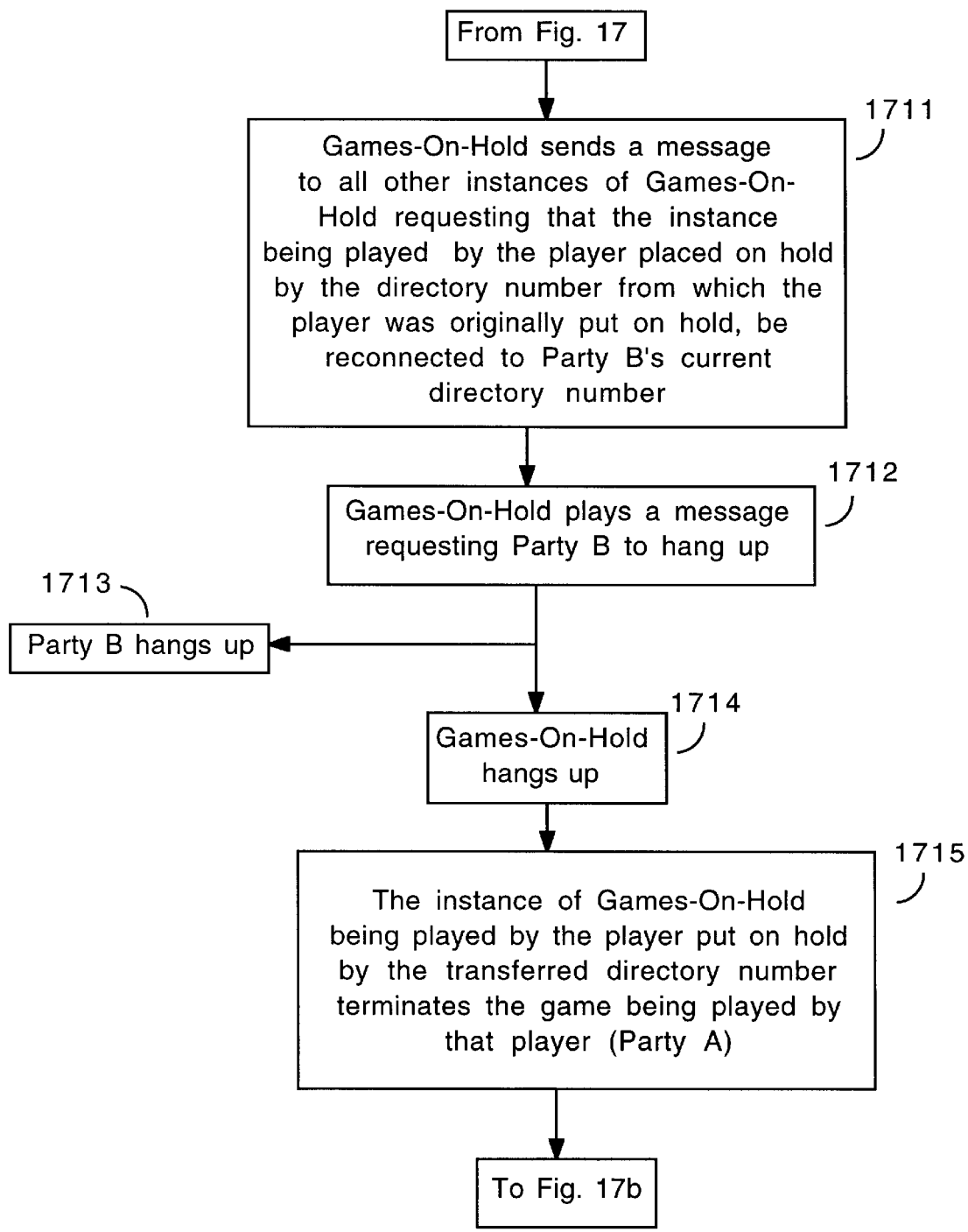

Referring now to FIG. 17a, games-on-hold software sends a message to all other instances of games-on-hold software requesting that the instance of games-on-hold being played by the player placed on hold by the directory number from which the player was originally put on hold, be reconnected to Party B's current directory number (block 1711). That directory number and the name of Party B is also transferred to all such instances of games-on-hold software in the same message. Games-on-hold software then plays a message requesting Party B to hang up (block 1712). Party B then hangs up (block 1713) and Party B's instance of games-on-hold also hangs up (block 1714). The instance of games-on--hold software being played by player placed on hold by the transferred directory number, i.e., player's instance of games-on-hold, terminates the game being played by that player, i.e., Party A (block 1715).

Figure 17B:
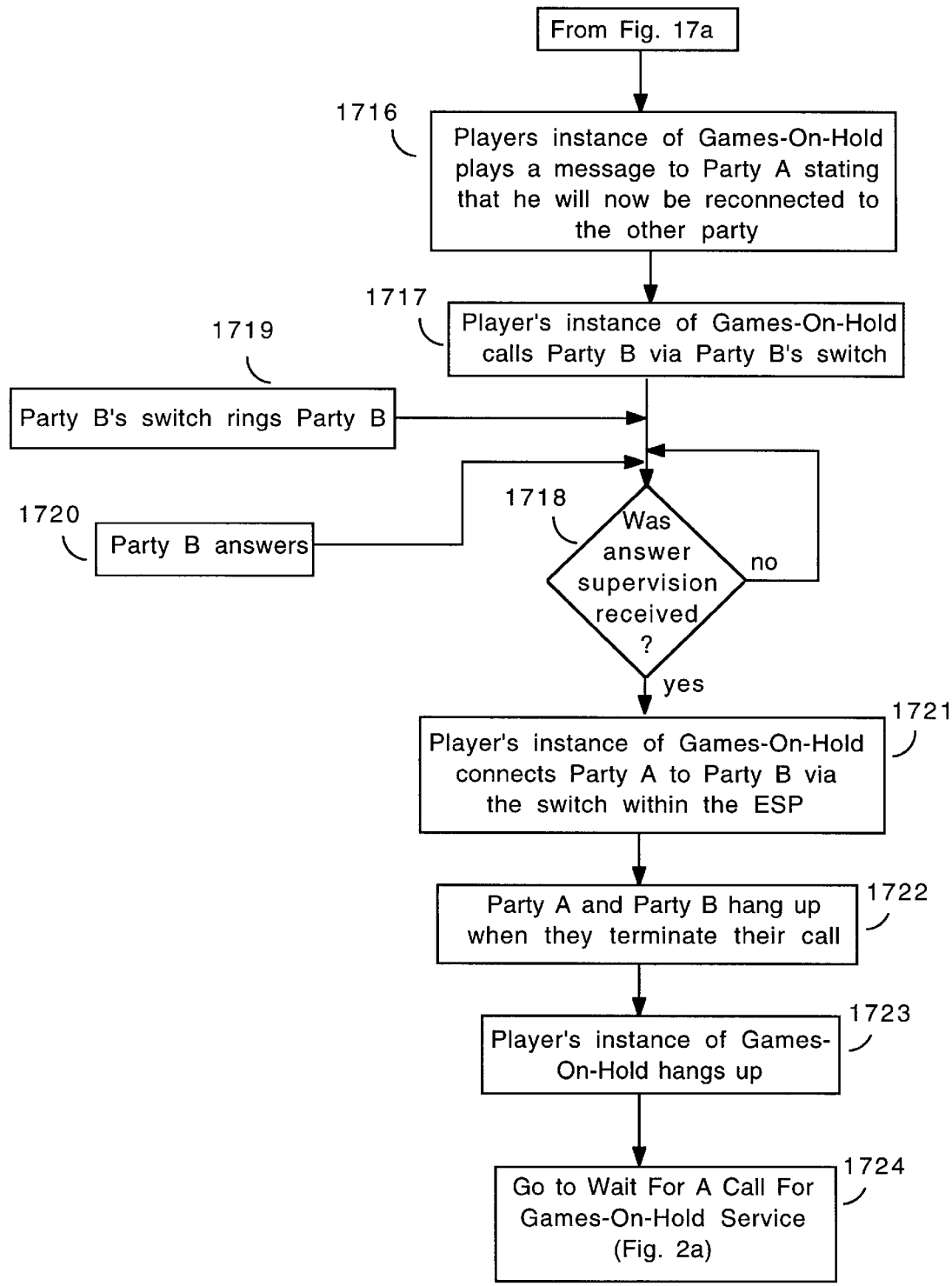

Referring now to FIG. 17b, the player's instance of games-on-hold software plays a message to Party A stating that he will now be reconnected to the other party, i.e., Party B (block 1716). The player's instance of games-on-hold software then calls Party B via Party B's switch (block 1717) and it then waits for receipt of answer supervision (block 1718). Party B's switch then rings Party B (block 1719) and Party B subsequently answers (block 1720), causing Party B's switch to send answer supervision to the ESP. When the player's instance of games-on-hold software detects answer supervision (block 1718) it connects Party A to Party B via the switch within the ESP (block 1721). Party A and Party B then communicate with each other and ultimately hang up when they terminate their call (block 1722). The player's instance of games-on-hold software then also hangs up (block 1723). The player's instance of games-on-hold software then goes to the Wait For A Call For Games-On-Hold Service mode of operation (block 1724).

As described above the various instances of games-on-hold software can communicate with each other and they do so through a message queue. At the end of each hand of play, each instance of the games-on-hold software checks the message queue to see if there are any messages for it. All messages are sent to all instances but messages for other instances are ignored while messages for that instance are processed upon retrieving them from the queue. The message format includes fields identifying the type of message, the directory number of the instance of games-on-hold software it is directed to (i.e., the directory number of the associated player which is known by that instance of games-on-hold software) the directory number associated with the instance of games-on-hold software sending the message, the message text, and any other message specific parameters. There are a fixed set of messages used by each instance of the software to communicate with each other. The messages are:

1. New player has arrived ("NewPlayer", PlayerDN)
2. Player has left ("PlayerLeft", SubscriberDN)
3. Player became the big winner ("newBigWinner", PlayerDN)
4. Player is looking around to see who is playing ("LookAround", SubscriberDN)
5. Player is playing ("InTheHouse", PlayerDN)
6. Player is sending a message to another player ("PlayerMessage", SubscriberDN, PlayerDN)
7. Subscriber is ready to retrieve the player ("RetrieveReady", PlayerDN, SubscriberDN)
8. Subscriber has a message for the player ("GOHMessage", PlayerDN)
9. Player forced to stop playing—lost game ("PlayerLost", PlayerDN)

All messages are sent to all instances of the software but only the instance that the message is addressed to takes any action (such as playing the message).

At the end of each hand of play, each instance checks a message queue to see if there are any messages for him. Messages for other instances are discarded while other messages are acted on right away. Alternative messaging arrangements such as an interrupt driven arrangement are old and well known.

Figure 18:
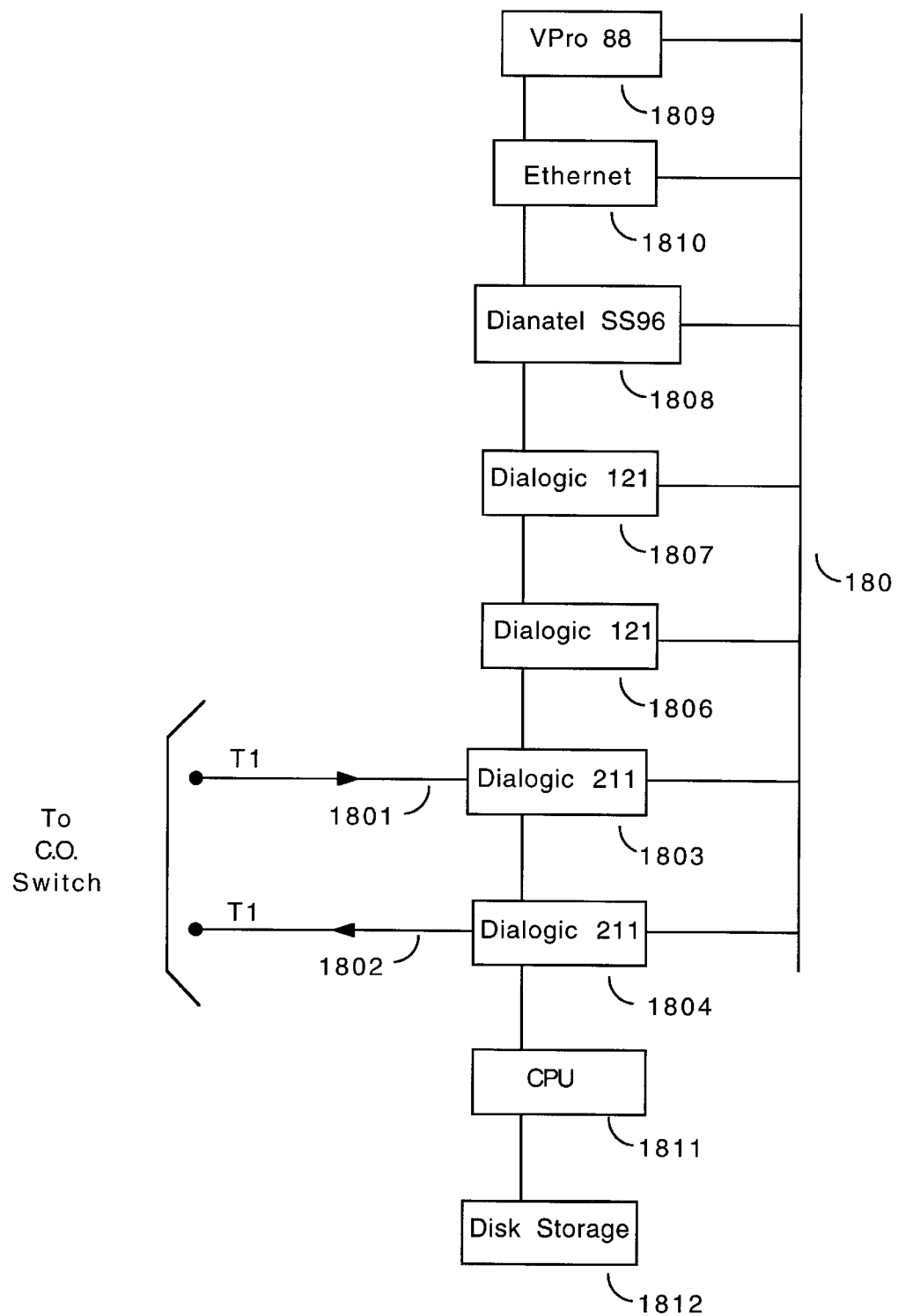
FIG. 18 is a block diagram of the Enhanced Services Platform of the present invention.

Referring now to FIG. 18, the ESP of the present invention is shown. The ESP interfaces with C.O. Switch 104 (FIG. 1) via incoming and outgoing T1 leads 1801 and 1802, respectively. Those leads are connected to Dialogic 211 cards 1803 and 1804, respectively, and they are also connected to voice bus 1805. Dialogic 121 cards 1806 and 1807, Dianatel SS96 card 1808, and V Pro-88 card 1809 are also connected to voice bus 1805. Ethernet 1810 is connected between Dianatel SS96 card 1808 and V Pro-88 card 1809. Dialogic 121 cards 1806 and 1807 are connected to each other and Dialogic 121 card 1807 is further connected to Dianatel SS96 card 1808. Dialogic 211 cards 1803 and 1804 are connected to each other and Dialogic 211 card 1803 is further connected to Dialogic 121 card 1806. CPU 1811 is connected between Disk Storage 1812 and Dialogic 211 card 1804.

Dialogic 211 cards 1803 and 1804 are interface cards to CO Switch 104 via T1 trunks 1801 and 1802, respectively. Dialogic 121 cards 1806 and 1807 are voice resources for playing prompt messages, collecting digits, recording voice files and making phone calls. Dianatel SS96 card 1808 provides an internal switching network within the ESP to switch voice channels from the Dialogic 121 and 211 cards and the V Pro-88 card, which provides for voice recognition of answers to the prompt messages. CPU 1811 runs the operating system and application software of the games-on-hold invention, and Disk Storage 1812 provides permanent storage for games-on-hold software, voice files and data. Ethernet 1810 provides networking capability for the system to expand into multiple units.

The above-described embodiment of games-on-hold is a novel arrangement for providing a person placed on hold with the opportunity to play games while on hold rather than merely wait discontentedly for the other party to return to the call. While only one such game was disclosed the variety of games that could be implemented under the present invention is virtually unlimited.

Figure 19:
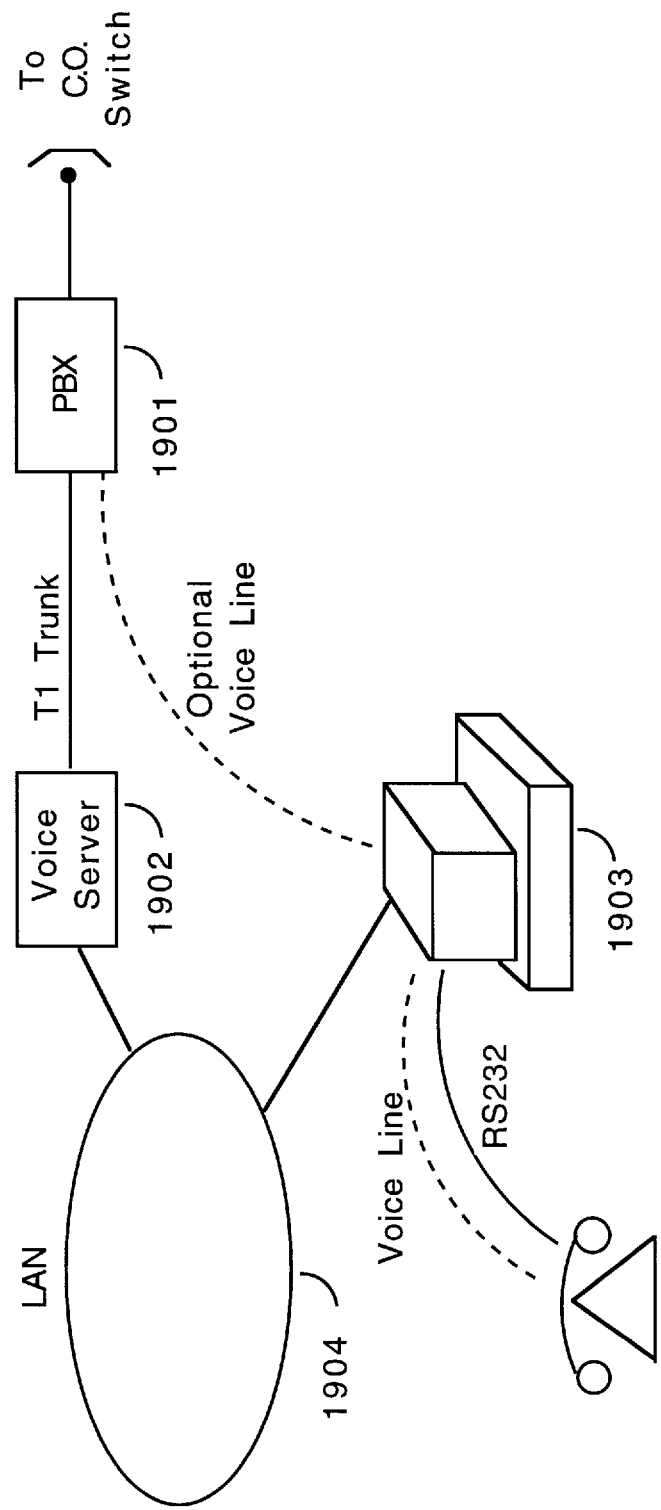
FIG. 19 is a block diagram of an alternative embodiment of the games-on-hold service of the present invention.

An alternative embodiment of the present invention is shown in FIG. 19. In that embodiment a subscriber's PC, i.e., Personal Computer, work station or other microcomputer, is used as the ESP. In FIG. 19 PBX 1901 is shown connected to Voice Server 1902 via a T1 trunk. Voice Server 1902 is further connected to PC 1903 via Local Area Network (LAN) 1904. In such an arrangement, known as computer telephony integration (CTI), calls come into PBX 1901 and go to Voice Server 1902, which contacts the subscriber via LAN 1904 and PC 1903. Using his keyboard or mouse, the subscriber tells PC 1903 to tell Voice Server 1902 to tell PBX 1901 how to handle the call, e.g., answer the call, take a message, put the call on hold, etc. In such an arrangement games-on-hold software and associated ESP cards, e.g., Dialogic, etc., could be added to the PC to allow the PC to operate as the ESP. Another alternative embodiment would be to implement the games-on-hold service within the Co switching system or other telecommunications network element. Thus, the ESP and games-on-hold software could be implemented at various points in the telecommunications network to provide the features claimed in the present invention.

A further alternative embodiment of the present invention utilizes a "Direct call access" feature rather than the call transfer feature. In this arrangement the games-on-hold subscriber calls the ESP directly, typically with a 7 digit telephone number. The ESP then asks what number to call and the games-on-hold subscriber dials or keys in that number. The ESP then calls that number and the subscriber hangs up while the ESP maintains the call with the other party. All other aspects of the games-on-hold service operate as previously described for the preferred embodiment.

This alternative embodiment applies best to telephone systems where call transfer is not available, for example many residential areas. It is also useful in small offices and with key telephone systems. Thus, the games-on-hold service can also be accessed in various ways to provide the features claimed in the present invention.

It will be obvious to those skilled in the art that numerous modifications of the present invention could be made without departing from the spirit of the invention which is limited only by the scope of the claims appended hereto.

What is claimed is:

1. A games-on-hold system for use in a telecommunication system including a switching system and first and second telecommunication devices connected to each other via said switching system, said first telecommunication device being operated by a first party and said second telecommunication device being operated by a subscriber to said games-on-hold system, said games-on-hold system comprising:

processing means;

said subscriber's telecommunication device being operated by said subscriber to access said processing means;

said processing means being operated in response to being accessed by said subscriber's telecommunication device to send a message to said subscriber's telecommunication device indicating that the subscriber can hang up to activate games-on-hold service;

said subscriber's telecommunication device being further operated to generate an on-hook signal when said subscriber hangs up;

said switching system being operated in response to said on-hook signal to connect said first party's telecommunication device to said processing means and to disconnect said subscriber's telecommunication device from said processing means;

said processing means being further operated in response to being connected to said first party's telecommunication device to send prompt messages to said first party's telecommunication device indicating game playing options available to said first party; and said first party's telecommunication device being operated by said first party to request selected game playing options by sending game option selection response messages to said processing means in response to said game option prompt messages;

whereby said processing means and said first party engage in a game by sending said game option prompt messages and said game option selection response messages, respectively.

2. A games-on-hold system as claimed in claim 1, wherein said processing means is further operated in response to being accessed by said subscriber's telecommunication device to send a message to said subscriber's telecommunication device indicating the response the subscriber can make to request reconnection of said subscriber's telecommunication device to said first party's telecommunication device;

said subscriber's telecommunication device being further operated by said subscriber to send said reconnection request response to said processing means; and said processing means being further operated in response to said reconnection request response to terminate the game being played by said first party and connect said first party's telecommunication device to said subscriber's telecommunication device.

3. A games-on-hold system as claimed in claim 2, wherein said processing means includes a switching network, said processing means being operated to connect said first party's telecommunication device to said subscriber's telecommunication device via said switching network.

4. A games-on-hold system for use in a telecommunication system including a switching system and first and second telecommunication devices connected to each other via said switching system, said first telecommunication device being operated by a first party and said second telecommunication device being operated by a subscriber to said games-on-hold system, said games-on-hold system comprising:

processing means;

said subscriber's telecommunication device being operated by said subscriber to access said processing means;

said processing means being operated in response to being accessed by said subscriber's telecommunication device to send a message to said subscriber's telecommunication device indicating the response the subscriber can make to activate games-on-hold service;

said subscriber's telecommunication device being further operated by said subscriber to send said activate games-on-hold response to said processing means;

said processing means being further operated in response to said activate games-on-hold response to send a message to said subscriber's telecommunication device indicating that the subscriber can hang up to further activate games-on-hold service; and said subscriber's telecommunication device being further operated to generate an on-hook signal when said subscriber hangs up;

said switching system being operated in response to said on-hook signal to connect said first: party's telecommunication device to said processing means and to disconnect said subscriber's telecommunication device from said processing means;

said processing means being further operated in response to being connected to said first party's telecommunication device to send prompt messages to said first party's telecommunication device indicating game playing options available to said first party; and said first party's telecommunication device being operated by said first party to request selected game playing options by sending game option selection response messages to said processing means in response to said game option prompt messages;

whereby said processing means and said first party engage in a game by sending said game option prompt messages and said game option selection response messages, respectively.

5. A games-on-hold system as claimed in claim 4, wherein said processing means is further operated in response to being accessed by said subscriber's telecommunication device to send a message to said subscriber's telecommunication device indicating the response the subscriber can make to request reconnection of said subscriber's telecommunication device to said first party's telecommunication device;

said subscriber's telecommunication device being further operated by said subscriber to send said reconnection request response to said processing means; and said processing means being further operated in response to said reconnection request response to terminate the game being played by said first party and connect said first party's telecommunication device to said subscriber's telecommunication device.

6. A games-on-hold system as claimed in claim 5, wherein said processing means is further operated in response to said reconnection request response to send a message to said first party's telecommunication device indicating that said first party will be reconnected to said subscriber.

7. A games-on-hold system as claimed in claim 5, wherein said processing means includes a switching network, said processing means being operated to connect said first party's telecommunication device to said subscriber's telecommunication device via said switching network.

8. A games-on-hold system as claimed in claim 4, wherein said processing means is further operated in response to being accessed by said subscriber's telecommunication device to send a message to said subscriber's telecommunication device indicating the response the subscriber can make to request reconnection of said subscriber's telecommunication device to said first party's telecommunication device when said first party is ready to be reconnected;

said subscriber's telecommunication device being further operated by said subscriber to send said reconnection request response to said processing means; and said processing means being further operated in response to said subscriber's reconnection request response to send a message to said first party's telecommunication device indicating the response the first party can make to request reconnection of said first party's telecommunication device to said subscriber's telecommunication device;

said processing means being further operated in response to said first party's reconnection request to terminate the game being played by said first party and connect said first party's telecommunication device to said subscriber's telecommunication device.

9. A games-on-hold system as claimed in claim 8, wherein said processing means includes a switching network, said processing means being operated to connect said first party's telecommunication device to said subscriber's telecommunication device via said switching network.

10. A games-on-hold system as claimed in claim 4, wherein said processing means is further operated in response to being accessed by said subscriber's telecommunication device to send a message to said subscriber's telecommunication device indicating the response the subscriber can make to record a message for the first party;

said subscriber's telecommunication device being further operated by said subscriber to send said record a message response to said processing means; and said processing means being further operated in response to said record a message response to send a message to said subscriber's telecommunication device prompting the subscriber to speak the message to be recorded;

said subscriber's telecommunication device being further operated by said subscriber to send the message spoken by the subscriber to said processing means;

said processing means being further operated to record said message, interrupt the game being played by said first party and send said recorded message to said first party's telecommunication device.

11. A games-on-hold system as claimed in claim 4, wherein said processing means includes card deck data representing playing cards, selectable by said processing means, and prediction data representing a higher or lower expectation for the next card selected by said processing means, and a balance amount associated with said first party from which said first party can bet, said processing means being further operated to select a first card from said card deck and select higher or lower prediction data and send a message to said first telecommunication device identifying the card selected, the higher or lower prediction of the next card drawn and a request that the first party bet a selected amount of his balance that the next card drawn will meet the object;

said first party's telecommunication device being operated by said first party to send a bet amount equal to a selected portion of said balance, to said processing means;

said processing means being further operated to select a second card from said card deck, compare said first card to said second card and determine whether said second card is higher or lower than said first card, said processing means being further operated to add the bet amount to the balance if the second card is higher and the prediction was higher or the second card is lower and the prediction was lower, said processing means being further operated to subtract said bet amount from said balance if the second card was higher and the prediction was lower or the second card was lower and the prediction was higher.

12. A games-on-hold system as claimed in claim 11, wherein said processing means is further operated to send a message to said first telecommunication device indicating the response the first party can make to inquire about the amount of his balance;

said first telecommunication device being further operated by said first party to send said inquire about the balance response to said processing means; and said processing means further operated in response to said inquire about the balance response to send a message to said first telecommunication device indicating the amount of the balance associated with said first party.

13. A games-on-hold system as claimed in claim 4, wherein said processing means includes data identifying said first telecommunication device and said processing means is further operated to send a message to said first telecommunication device indicating the response the first party can make to record a name to be associated with the identification of said first telecommunication device;

said first telecommunication device being further operated by said first party to send name to be associated with the identification of said first telecommunication device response to said processing means; and said processing means being further operated in response to said name to be associated with the identification of said first telecommunication device response to store said name in association with the identification of said telecommunication device.

14. A games-on-hold system as claimed in claim 4, wherein said processing means is further operated to send a message to said first telecommunication device indicating the response the first party can make to quit playing the game;

said first telecommunication device being further operated by said first party to send said quit playing the game response to said processing means;

said processing means being further operated in response to said quit playing the game response to terminate the game being played by said first party and connect said first party's telecommunication device to said subscriber's telecommunication device.

15. A games-on-hold system as claimed in claim 4, wherein there are a plurality of said first telecommunication devices connected to said processing means, which includes an identifier for each first telecommunication device, each operated by an associated one of a plurality of first parties, said processing means being further operated to send a message to a first one of said first telecommunication devices indicating the response the associated first party can make to send a message to another first party;

said first one of said first telecommunication devices being further operated by said associated first party to send said send a message response to said processing means;

said processing means being further operated in response to said send a message response to send a message to said first one of said first telecommunication devices prompting said associated first party to speak the message to be sent to another first party and to send a message identifying the first telecommunication device of said another first party;

said first one of said first telecommunication devices being further operated by said first party in response to said prompt message to send to said processing means said message to be sent to said another first party and the identification of said another first party's first telecommunication device; and said processing means being further operated receive said message to be sent to said another first party and said identification of said another first party's first telecommunication device to send to the first telecommunication device indicated by said identification said message to be sent to said another first party.

16. A games-on-hold system as claimed in claim 15, wherein said processing system comprises a processor and a plurality of instances of games-on-hold software each associated with a different first or second telecommunication device and each being operable to receive messages from, and send messages to, each other.

17. A games-on-hold system as claimed in claim 16, wherein said processing means includes a message queue, each instance of games-on-hold software being operated to communicate with each other by sending messages to said message queue with an identifier of the telecommunication device associated with the other instance of games-on-hold software to which the message is directed;

each instance of games on hold software being further operated to periodically scan said message queue and retrieve from said message queue those messages having an identifier of the telecommunication device associated with the instance of games-on-hold software scanning said message queue.

18. A games-on-hold system as claimed in claim 4, wherein there are a plurality of said first telecommunication devices connected to said processing means, which includes an identifier for each first telecommunication device, each operated by an associated one of a plurality of first parties, said processing means being further operated to send a message to a first one of said first telecommunication devices indicating the response the associated first party can make to request the name of any other first parties connected to said processing means;

said first one of said first telecommunication devices being further operated so send said request the name response to said processing means; and said processing means being further operated in response to said request the name response to send a message to said first one of said first telecommunication devices indicating the name of the other first parties associated with any other first telecommunication device connected to said processing means.

19. A games-on-hold system as claimed in claim 18, wherein said processing means is further operated in response to said request the name response to send a message to said first one of said first telecommunication devices indicating in association with said name the identifier of said other first telecommunication devices.

20. A games-on-hold system as claimed in claim 18, wherein said processing system comprises a processor and a plurality of instances of games-on-hold software each associated with a different first or second telecommunication device and each being operable to receive messages from, and send messages to, each other.

21. A games-on-hold system as claimed in claim 20, wherein said processing means includes a message queue, each instance of games-on-hold software being operated to communicate with each other by sending messages to said message queue with an identifier of the telecommunication device associated with the other instance of games-on-hold software to which the message is directed;

each instance of games on hold software being further operated to periodically scan said message queue and retrieve from said message queue those messages having an identifier of the telecommunication device associated with the instance of games-on-hold software scanning said message queue.

* * * * *